(12) United States Patent
Wehrmann et al.

(10) Patent No.: US 11,505,665 B2
(45) Date of Patent: *Nov. 22, 2022

(54) MULTILAYER COMPOSITE MATERIAL CONTAINING SPECIAL POLYCARBONATE COMPOSITIONS AS A MATRIX MATERIAL

(71) Applicant: Covestro Deutschland AG, Leverkusen (DE)

(72) Inventors: Rolf Wehrmann, Krefeld (DE); Helmut Werner Heuer, Siegen (DE); Anke Boumans, Bedburg-Hau (DE); John Bauer, Kitzingen (DE)

(73) Assignee: Covestro Deutschland AG, Leverkusen (DE)

( * ) Notice: Subject to any disclaimer, the term of this patent is extended or adjusted under 35 U.S.C. 154(b) by 217 days.

This patent is subject to a terminal disclaimer.

(21) Appl. No.: 16/956,546

(22) PCT Filed: Dec. 12, 2018

(86) PCT No.: PCT/EP2018/084541
§ 371 (c)(1),
(2) Date: Jun. 19, 2020

(87) PCT Pub. No.: WO2019/121227
PCT Pub. Date: Jun. 27, 2019

(65) Prior Publication Data
US 2022/0135754 A1    May 5, 2022

(30) Foreign Application Priority Data
Dec. 19, 2017  (EP) .................................... 17208308

(51) Int. Cl.
*C08J 5/24* (2006.01)
*B29C 70/20* (2006.01)
(Continued)

(52) U.S. Cl.
CPC ............. *C08J 5/243* (2021.05); *B29C 70/202* (2013.01); *B29C 70/465* (2013.01); *C08K 5/523* (2013.01);
(Continued)

(58) Field of Classification Search
CPC ........ C08L 69/00; C08L 69/005; C08L 25/00; C08K 5/5399; C08K 5/0066; C08K 5/51;
(Continued)

(56) References Cited

U.S. PATENT DOCUMENTS 2,991,273 A    7/1961  Wilhelm et al.
2,999,835 A    9/1961  Goldberg
(Continued)

FOREIGN PATENT DOCUMENTS

DE    1570703 A1    2/1970
DE    1961668 A1    6/1970
(Continued)

OTHER PUBLICATIONS

International Preliminary Report on Patentability received for PCT Patent Application No. PCT/EP2018/084541, dated Jul. 2, 2020, 16 pages (9 pages of English Translation and 7 pages of Original Document).

(Continued)

*Primary Examiner* — Camie S Thompson
(74) *Attorney, Agent, or Firm* — Faegre Drinker Biddle & Reath LLP

(57) ABSTRACT

The present invention relates to a composite material comprising one or more fibre layers composed of a fibre material and an aromatic polycarbonate-based matrix material. The fibre layer(s) is/are embedded in the matrix material. The present invention further relates to a process for producing these fibre composite materials, to multilayer composite materials comprising several layers of fibre composite mate- (Continued)

Figure 1:
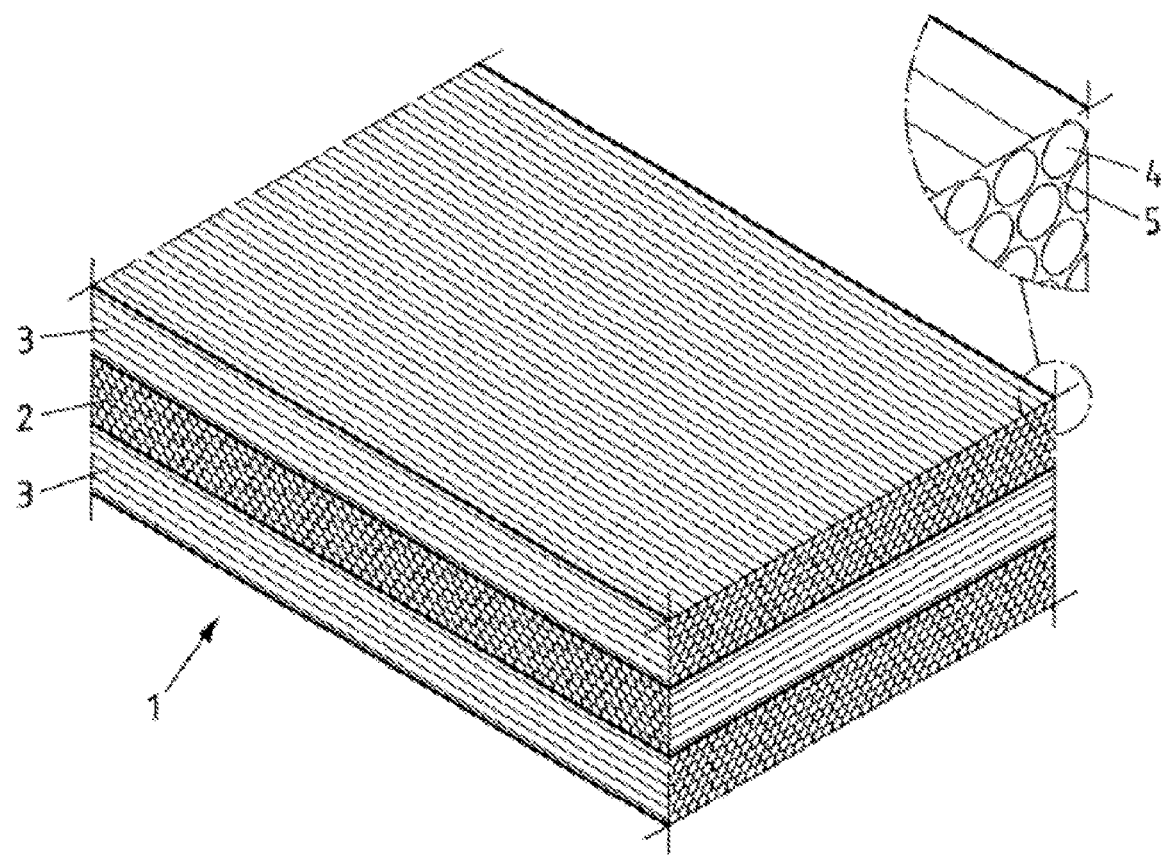

rial, and to the use of the composite materials for production of components or housing components or housings, and to the components, housing components or housings themselves.

13 Claims, 3 Drawing Sheets

(51) Int. Cl.
    *B29C 70/46*         (2006.01)
    *C08K 5/523*       (2006.01)
    *C08K 5/5399*     (2006.01)
    *B29K 101/12*     (2006.01)

(52) U.S. Cl.
    CPC ........ *C08K 5/5399* (2013.01); *B29K 2101/12* (2013.01); *C08J 2369/00* (2013.01)

(58) Field of Classification Search
    CPC ... C08K 7/02; C08K 7/04; C08K 3/106; C08J 2369/00; C08J 2469/00
    USPC ........... 428/36.4, 295.4, 297.1, 287.4, 299.1, 428/299.4; 524/101, 106, 116, 127, 147
    See application file for complete search history.

(56) References Cited

U.S. PATENT DOCUMENTS

| | | | |
|---|---|---|---|
| 2,999,846 | A | 9/1961 | Hermann et al. |
| 3,148,172 | A | 9/1964 | Fox |
| 3,271,367 | A | 9/1966 | Hermann et al. |
| 3,654,575 | A | 4/1972 | Cluwen |
| 4,982,014 | A | 1/1991 | Freitag et al. |
| 5,097,002 | A | 3/1992 | Sakashita et al. |
| 5,340,905 | A | 8/1994 | Kuehling et al. |
| 5,717,057 | A | 2/1998 | Sakashita et al. |
| 2016/0257794 | A1* | 9/2016 | Grimm ..................... C08J 5/043 |
| 2022/0025134 | A1* | 1/2022 | Wehrmann ............... C08K 3/30 |

FOREIGN PATENT DOCUMENTS

| | | |
|---|---|---|
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 102011005462 B3 | 6/2012 |
| DE | 102011090143 A1 | 7/2013 |
| EP | 0363608 A1 | 4/1990 |
| EP | 0640655 A2 | 3/1995 |
| EP | 0728811 A2 | 8/1996 |
| EP | 2886305 A1 | 6/2015 |
| FR | 1561518 A | 3/1969 |
| GB | 1122003 A | 7/1968 |
| GB | 1341318 A | 12/1973 |
| WO | 97/40092 A1 | 10/1997 |
| WO | 01/05866 A1 | 1/2001 |
| WO | 2004/063249 A1 | 7/2004 |
| WO | 2012/123302 A1 | 9/2012 |
| WO | 2013/098224 A1 | 7/2013 |
| WO | 2015/052106 A2 | 4/2015 |
| WO | 2015/052114 A1 | 4/2015 |
| WO | 2018/007335 A1 | 1/2018 |

OTHER PUBLICATIONS

International Search Report and Written Opinion received for PCT Patent Application No. PCT/EP2018/084541, dated Apr. 18, 2019, 18 pages (8 pages of English Translation and 10 pages of Original Document).

* cited by examiner

MULTILAYER COMPOSITE MATERIAL CONTAINING SPECIAL POLYCARBONATE COMPOSITIONS AS A MATRIX MATERIAL

CROSS-REFERENCE TO RELATED APPLICATIONS

This application is a national stage application (under 35 U.S.C. § 371) of PCT/EP2018/084541, filed Dec. 12, 2018, which claims benefit of European Application No. 17208308.1, filed Dec. 19, 2017, both of which are incorporated herein by reference in their entirety.

The present invention relates to a fibre composite material comprising one or more fibre layers composed of a fibre material and a polycarbonate-based composition as matrix material, and to a multilayer composite material composed of at least two layers of fibre composite material. The fibre layer(s) is/are embedded in the matrix material. The present invention further relates to a process for producing these fibre composite materials or multilayer composite materials, and to the housings or housing components composed of these (multilayer) composite materials.

Fibre-containing multilayer composite materials having a matrix based on a thermoplastic polymer are referred to both hereinafter and in the prior art as "organosheets".

Organosheets of this kind have higher strength and stiffness compared to extruded plastics sheets without fibre reinforcement and even extend as far as, or can actually surpass, the strength and stiffness of metallic sheets. The significance of materials of this kind, for example as housing components in the electronics and IT industry, but also in the automotive and aircraft industry, is increasing constantly. These composite materials have high stiffness coupled with simultaneously excellent mechanical properties. Compared to conventional materials such as steel, they additionally have a distinct weight advantage. Owing to the fields of use, it is a requirement that the materials used have high flame retardancy.

Further fields of use of such multilayer composite materials are in sectors where lightweight and load-bearing structures are required. As well as the already mentioned automotive sector—for example for tailgates, roof modules, door modules, crossmembers, front-end and rear-end configurations, dashboards etc.—and for aircraft construction, these sectors are utility vehicle construction, the rail vehicles sector, and also items for everyday use, for example domestic appliances.

A further advantage of such polymer-supported multilayer composite materials is the risk of corrosion, which is reduced or entirely ruled out through the absence of steel.

It is known that multilayer composite materials composed of fibre layers such as glass fibre layers or carbon fibre layers can be manufactured in combination with thermoplastic materials. Suitable thermoplastic substrate materials are in principle a multitude of thermoplastics, such as polyethylene or polypropylene, polyamides, for example nylon-6, nylon-6,6, nylon-6,12, polycarbonates, especially aromatic polycarbonates based on bisphenol A, thermoplastic polyurethanes, polyoxymethylene, polyphenylene ethers, styrene polymers, for example polystyrene, and styrene-containing copolymers such as acrylonitrile-butadiene-styrene copolymers and styrene-acrylonitrile copolymers, polytetrafluoroethylene, polyaromatics, for example polyphenylene sulfide, polyether sulfone, polysulfone, polyether ether ketone, polyether imide, polyacrylate or polyamide imide, polyquinoxalines, polyquinolines or polybenzimidazoles, polyesters such as polyethylene terephthalate or polybutylene terephthalate, polyacrylonitrile or polyvinyl compounds such as polyvinyl chloride, polyvinylidene chloride, polyvinyl esters, for example polyvinyl acetate, polyvinyl alcohols, polyvinyl acetals, polyvinyl ethers, polyvinyllactams, polyvinylamines and mixtures of the polymers mentioned.

The production of endless fibre-containing composite materials is described, for example, in EP 2 886 305 A1. The use of polycarbonate as matrix material is also mentioned here.

An advantageous process for producing fibre composite materials is described in WO 2012/123302 A1. In this process, the melt application is followed by pressure-shear vibration until the raw fibre composite material layer has a temperature above the glass transition temperature of the polymer, which achieves effective incorporation of the polymer melt into the entire fibre volume structure of the raw fibre composite material layer. The pressure-shear vibration efficiently drives out gas volumes still present within the raw fibre composite material layer.

It has been found that polycarbonate-based compositions that the person skilled in the art would consider suitable as matrix materials for production of fibre composite materials cannot be processed simultaneously by this advantageous process to give fibre composite materials and lead to multilayer composite materials having good flame retardancy properties. Polycarbonate compositions of this kind do not have adequate impregnation properties to achieve an intimate bond between the fibres of the fibre tapes and the polycarbonate phase. This effect is also referred to as inadequate fibre coupling to the matrix and leads to adverse properties, for example elevated brittleness and poorer mechanical properties. Furthermore, elevated dust formation is observed at the surfaces of the fibre composite materials, since the (mechanical) wear on the fibres is higher than in the case of good fibre-matrix coupling. The effects mentioned can also lead to poorer flame retardancy properties. To improve fibre attachment in the advantageous process, it is possible to adjust the viscosity of the polymer matrix. This is readily possible with available polycarbonates. A further advantage of polycarbonates as matrix material is the known good mechanical properties, particularly toughness. The combination of tough matrix material with stiff fibres should lead to improved fibre composite materials.

The problem addressed was therefore that of providing a fibre composite material which meets the UL 94 V-0 requirement at 0.7 mm in the overall assessment (48 h, 23° C. and 7 d, 70° C.), and here is suitable as housing material, possibly as multilayer composite material, for a housing of an electronic device. For this purpose, the material should additionally be very lightweight and be producible very inexpensively, for example via the process specified.

It has been found that, surprisingly, this problem is solved by a fibre composite material comprising at least one layer of fibre material embedded into an aromatic polycarbonate-based composition, wherein the composition comprises A) at least 65% by weight of at least one aromatic polycarbonate, B) 7% by weight to 15% by weight of at least one cyclic phosphazene of formula (1)

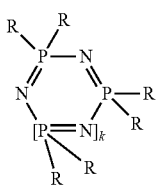

(1)

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical, k is an integer from 1 to 10, C) 0 to 11% by weight of at least one phosphorus compound of the general formula (2)

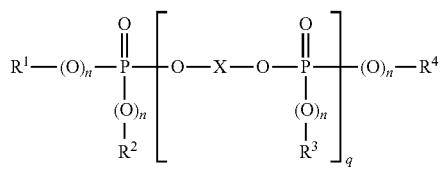

(2)

where $R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged, D) optionally further additives, and wherein the composition is free of anti-dripping agents and free of talc, and wherein a total of at least 14% by weight of component B+component C is present, based on the overall composition.

The figures given here in "% by weight" are based in each case on the overall aromatic polycarbonate-based composition.

The present invention further provides a multilayer composite material comprising at least two and preferably at least three superposed layers of such a fibre composite material, wherein, in the case of three layers, these are defined relative to one another as two outer layers of fibre composite material and at least one inner layer of fibre composite material. The layers of fibre composite material may consist of the same or of different material of the above-described composition; preferably, the matrix material is the same in all layers. In addition to the layers of fibre composite material according to the invention, the multilayer composite material may further comprise further layers of fibre composite material.

"At least one" in the context of the present invention means that the respective component of the composition need not be formed by one compound alone, but may also comprise a mixture of two or more components of the group defined in general terms.

Matrix Material

Component A

Polycarbonates in the context of the present invention are either homopolycarbonates or copolycarbonates and/or polyester carbonates; the polycarbonates may be linear or branched in a known manner. According to the invention, it is also possible to use mixtures of polycarbonates.

The thermoplastic polycarbonates including the thermoplastic aromatic polyester carbonates preferably have mean molecular weights $M_w$, determined by gel permeation chromatography, of 15 000 g/mol to 40 000 g/mol, more preferably of 18 000 g/mol to 33 000 g/mol, most preferably of 22 000 g/mol to 32 000 g/mol, most preferably of 23 000 to 25 000 g/mol. Calibration is effected with linear polycarbonates (formed from bisphenol A and phosgene) of known molar mass distribution from PSS Polymer Standards Service GmbH, Germany, calibration by method 2301-0257502-09D (from 2009 in German) from Currenta GmbH & Co. OHG, Leverkusen. The eluent is dichloromethane. Column combination of crosslinked styrene-divinylbenzene resins. Diameter of the analytical columns: 7.5 mm; length: 300 mm. Particle size of the column material: 3 µm to 20 µm. Concentration of solutions: 0.2% by weight. Flow rate: 1.0 ml/min, temperature of the solutions: 30° C. Detection with the aid of a reflective index (RI) detector.

A portion of up to 80 mol %, preferably of 5 mol % to 50 mol %, of the carbonate groups in the polycarbonates used in accordance with the invention may be replaced by aromatic or aliphatic dicarboxylic ester groups. Polycarbonates that incorporate both acid radicals from the carbonic acid and acid radicals from aromatic dicarboxylic acids into the molecular chain are referred to as aromatic polyester carbonates. In the context of the present invention, they are covered by the umbrella term of thermoplastic aromatic polycarbonates.

The polycarbonates are prepared in a known manner from dihydroxyaryl compounds, carbonic acid derivatives, optionally chain terminators and optionally branching agents, and the polyester carbonates are prepared by replacing a portion of the carbonic acid derivatives with aromatic dicarboxylic acids or derivatives of the dicarboxylic acids, to a degree according to the extent to which carbonate structural units in the aromatic polycarbonates are to be replaced by aromatic dicarboxylic ester structural units.

Dihydroxyaryl compounds suitable for the preparation of polycarbonates are those of the formula (3)

 (3)

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (3) is a radical of the formula (4)

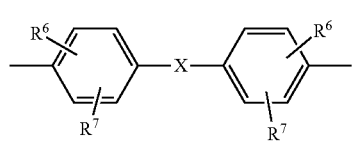
(4)

where

R$^6$ and R$^7$ are independently H, C$_1$- to C$_{18}$-alkyl-, C$_1$- to C$_{18}$-alkoxy, halogen such as Cl or Br or in each case optionally substituted aryl or aralkyl, preferably H or C$_1$- to C$_{12}$-alkyl, more preferably H or C$_1$- to C$_8$-alkyl and most preferably H or methyl, and X is a single bond, —SO$_2$—, —CO—, —O—, —S—, C$_1$- to C$_6$-alkylene, C$_2$- to C$_5$-alkylidene or C$_5$- to C$_6$-cycloalkylidene which may be substituted by C$_1$- to C$_6$-alkyl, preferably methyl or ethyl, and also C$_6$- to C$_{12}$-arylene which may optionally be fused to aromatic rings containing further heteroatoms.

Preferably, X is a single bond, C$_1$- to C$_5$-alkylene, C$_2$- to C$_5$-alkylidene, C$_5$- to C$_6$-cycloalkylidene, —O—, —SO—, —CO—, -S—, —SO$_2$— or a radical of the formula (5)

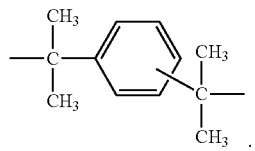
(5)

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis (hydroxyphenyl) sulfones, bis(hydroxyphenyl) sulfoxides, 1,1'-bis(hydroxyphenyl)diisopropylbenzenes and the ring-alkylated and ring-halogenated compounds thereof.

Examples of dihydroxyaryl compounds suitable for the preparation of the polycarbonates and copolycarbonates to be used in accordance with the invention include hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis (hydroxyphenyl) ketones, bis(hydroxyphenyl) sulfones, bis (hydroxyphenyl) sulfoxides, α,α'-bis(hydroxyphenyl) diisopropylbenzenes, and the alkylated, ring-alkylated and ring-halogenated compounds thereof. Preparation of copolycarbonates can also be accomplished using Si-containing telechelics, such that what are called Si copolycarbonates are obtained.

Preferred dihydroxyaryl compounds are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC), and also the bisphenols (I) to (III)

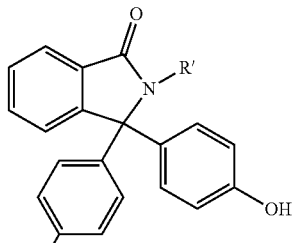
(I)

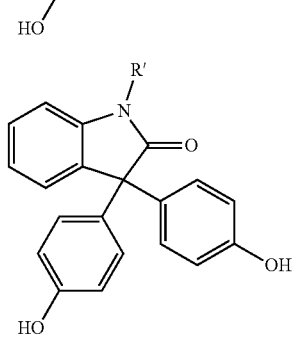
(II)

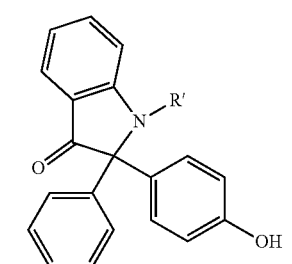
(III)

in which R' in each case is a C$_1$- to C$_4$-alkyl radical, aralkyl radical or aryl radical, preferably a methyl radical or phenyl radical, most preferably a methyl radical.

Particularly preferred dihydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), and also the diphenols of the formulae (I), (II) and/or (III).

These and further suitable dihydroxyaryl compounds are described, for example, in U.S. Pat. Nos. 2,999,835 A, 3,148,172 A, 2,991,273 A, 3,271,367 A, 4,982,014 A and 2,999,846 A, in German published specifications 1 570 703 A, 2 063 050 A, 2 036 052 A, 2 211 956 A and 3 832 396 A, in French patent specification 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff.".

Only one dihydroxyaryl compound is used in the case of the homopolycarbonates; two or more dihydroxyaryl compounds are used in the case of copolycarbonates.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane or the two monomers bisphenol A and 4,4'-dihydroxydiphenyl, and homo- or copolycarbonates derived from the dihydroxyaryl compounds of the formulae (I), (II) and/or (III)

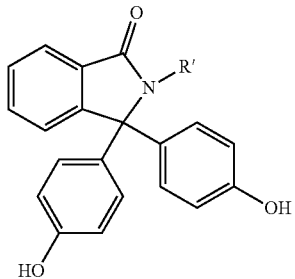

(I)

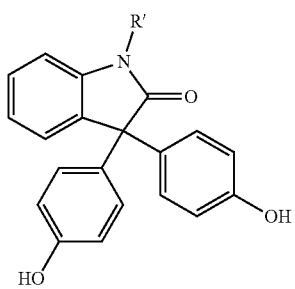

(II)

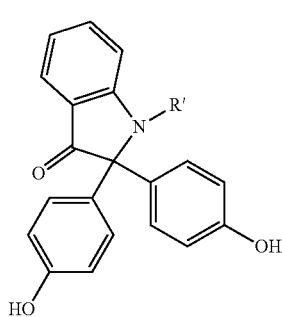

(III)

in which R' in each case is $C_1$- to $C_4$-alkyl, aralkyl or aryl, preferably methyl or phenyl, most preferably methyl, especially with bisphenol A.

The dihydroxyaryl compounds used, like all the other chemicals and auxiliaries added to the synthesis, may be contaminated with the impurities originating from their own synthesis, handling and storage. However, it is desirable to work with the purest possible raw materials.

Preference is also given to copolycarbonates having one or more monomer units of a siloxane of the general formula (IV)

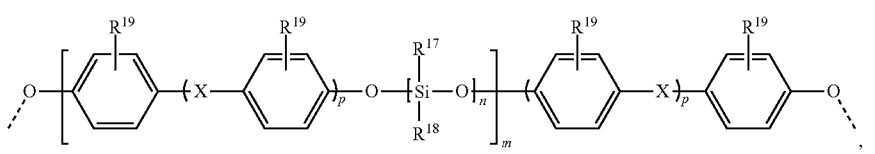

(IV)

where $R^{19}$ is hydrogen, Cl, Br or a $C_1$- to $C_4$-alkyl radical, preferably hydrogen or a methyl radical, more preferably hydrogen, $R^{17}$ and $R^{18}$ are the same or different and are each independently an aryl radical, a $C_1$- to $C_{10}$-alkyl radical or a $C_1$- to $C_{10}$-alkylaryl radical, preferably each a methyl radical, and where X is a single bond, —CO—, —O—, a $C_1$- to $C_6$-alkylene radical, a $C_2$- to $C_5$-alkylidene radical, a $C_5$- to $C_{12}$-cycloalkylidene radical or a $C_6$- to $C_{12}$-arylene radical which may optionally be fused to further aromatic rings containing heteroatoms, where X is preferably a single bond, a $C_1$- to $C_5$-alkylene radical, a $C_2$- to $C_5$-alkylidene radical, a $C_5$- to $C_{12}$-cycloalkylidene radical, —O— or —CO—, further preferably a single bond, an isopropylidene radical, a $C_5$- to $C_{12}$-cycloalkylidene radical or —O—, most preferably an isopropylidene radical, n is a number from 1 to 500, preferably from 10 to 400, more preferably from 10 to 100, most preferably from 20 to 60, m is a number from 1 to 10, preferably from 1 to 6, more preferably from 2 to 5, p is 0 or 1, preferably 1, and the value of n×m is preferably between 12 and 400, further preferably between 15 and 200, where the siloxane is preferably reacted with a polycarbonate in the presence of an organic or inorganic salt of a weak acid having a $pK_A$ of 3 to 7 (25° C.).

Copolycarbonates having monomer units of the formula (IV) and especially also the preparation thereof are described in WO 2015/052106 A2.

The total proportion of the monomer units of the formulae (I), (II), (III), 4,4'-dihydroxydiphenyl and/or bisphenol TMC in the copolycarbonate is preferably 0.1-88 mol %, more preferably 1-86 mol %, even more preferably 5-84 mol % and especially 10-82 mol % (based on the sum total of the moles of dihydroxyaryl compounds used).

The copolycarbonates may be in the form of block and random copolycarbonate. Particular preference is given to random copolycarbonates.

The ratio of the frequency of the diphenoxide monomer units in the copolycarbonate is calculated here from the molar ratio of the dihydroxyaryl compounds used.

The relative solution viscosity of the copolycarbonates, determined to ISO 1628-4:1999, is preferably in the range of 1.15-1.35.

The monofunctional chain terminators required to control the molecular weight, such as phenols or alkylphenols, especially phenol, p-tert-butylphenol, isooctylphenol, cumylphenol, the chlorocarbonic esters thereof or acid chlorides of monocarboxylic acids or mixtures of these chain terminators, are either supplied to the reaction with the bisphenoxide(s) or else added to the synthesis at any desired juncture, provided that phosgene or chlorocarbonic acid end groups are still present in the reaction mixture, or in the case of the acid chlorides and chlorocarbonic esters as chain terminators, provided that sufficient phenolic end groups of the forming polymer are available. Preferably, the chain terminator(s), however, is/are added after the phosgenation at a location or at a juncture where no phosgene is present any longer, but the catalyst has not yet been metered in, or they are metered in upstream of the catalyst, together with the catalyst or in parallel.

Any branching agents or branching agent mixtures to be used are added to the synthesis in the same way, but typically before the chain terminators. Typically, trisphenols, quaterphenols or acid chlorides of tri- or tetracarboxylic acids are used, or else mixtures of the polyphenols or the acid chlorides.

Some of the compounds having three or more than three phenolic hydroxyl groups that are usable as branching agents are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of any branching agents to be used is 0.05 mol % to 2 mol %, again based on moles of dihydroxyaryl compounds used in each case.

The branching agents may either be included together with the dihydroxyaryl compounds and the chain terminators in the initially charged aqueous alkaline phase or be added dissolved in an organic solvent before the phosgenation.

All these measures for preparation of the polycarbonates are familiar to those skilled in the art.

Aromatic dicarboxylic acids suitable for the preparation of the polyester carbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of the dicarboxylic acids are the dicarbonyl halides and the dialkyl dicarboxylates, especially the dicarbonyl chlorides and the dimethyl dicarboxylates.

The carbonate groups are replaced essentially stoichiometrically and also quantitatively by the aromatic dicarboxylic ester groups, and so the molar ratio of the coreactants is also reflected in the finished polyester carbonate. The aromatic dicarboxylic ester groups can be incorporated either randomly or in blocks.

Preferred modes of preparation of the polycarbonates for use in accordance with the invention, including the polyestercarbonates, are the known interfacial process and the known melt transesterification process (cf. e.g. WO 2004/063249 A1, WO 2001/05866 A1, U.S. Pat. Nos. 5,340,905 A, 5,097,002 A, 5,717,057 A).

In the former case, the acid derivatives used are preferably phosgene and optionally dicarbonyl chlorides, and in the latter case preferably diphenyl carbonate and optionally dicarboxylic esters. Catalysts, solvents, workup, reaction conditions etc. for polycarbonate preparation or polyester carbonate preparation are sufficiently well-described and known in both cases.

"Polycarbonate compositions" or else "polycarbonate-based compositions", which are the compositions according to the invention for the matrix material, are those compositions wherein the base material, i.e. the predominant component present, is a polycarbonate. "Predominant" here means at least 65% by weight, preferably at least 75% by weight, even more preferably still at least 80% by weight, more preferably up to 85% by weight of aromatic polycarbonate, most preferably 75 to 87% by weight, of aromatic polycarbonate.

Component B

Phosphazenes according to component B which are used according to the present invention are cyclic phosphazenes of formula (1)

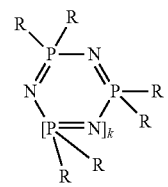

(1)

where
R in each case is the same or different and is
an amine radical,
an in each case optionally halogenated, preferably fluorinated, more preferably monohalogenated, $C_1$- to $C_8$-alkyl radical, preferably methyl radical, ethyl radical, propyl radical or butyl radical,
a $C_1$- to $C_8$-alkoxy radical, preferably a methoxy radical, ethoxy radical, propoxy radical or butoxy radical,
an in each case optionally alkyl-substituted, preferably $C_1$- to $C_4$-alkyl-substituted, and/or halogen-substituted, preferably chlorine- and/or bromine-substituted, $C_5$- to $C_6$-cycloalkyl radical,
an in each case optionally alkyl-substituted, preferably $C_1$- to $C_4$-alkyl-substituted, and/or halogen-substituted, preferably chlorine-, bromine- and/or hydroxy-substituted, $C_6$- to $C_{20}$-aryloxy radical, preferably phenoxy radical, naphthyloxy radical,
an in each case optionally alkyl-substituted, preferably $C_1$- to $C_4$-alkyl-substituted, and/or halogen-substituted, preferably chlorine- and/or bromine-substituted, $C_7$- to $C_{12}$-aralkyl radical, preferably phenyl-$C_1$- to $C_4$-alkyl radical, or
a halogen radical, preferably chlorine or fluorine, or
an OH radical,
k is an integer from 1 to 10, preferably a number from 1 to 8, more preferably 1 to 5, most preferably 1.

Preference is given in accordance with the invention to using commercially available phosphazenes; these are typically mixtures of cycles of different ring size.

Preference is given to, either individually or in a mixture: propoxyphosphazene, phenoxyphosphazene, methylphenoxyphosphazene, aminophosphazene, fluoroalkylphosphazenes, and phosphazenes of the following structures:

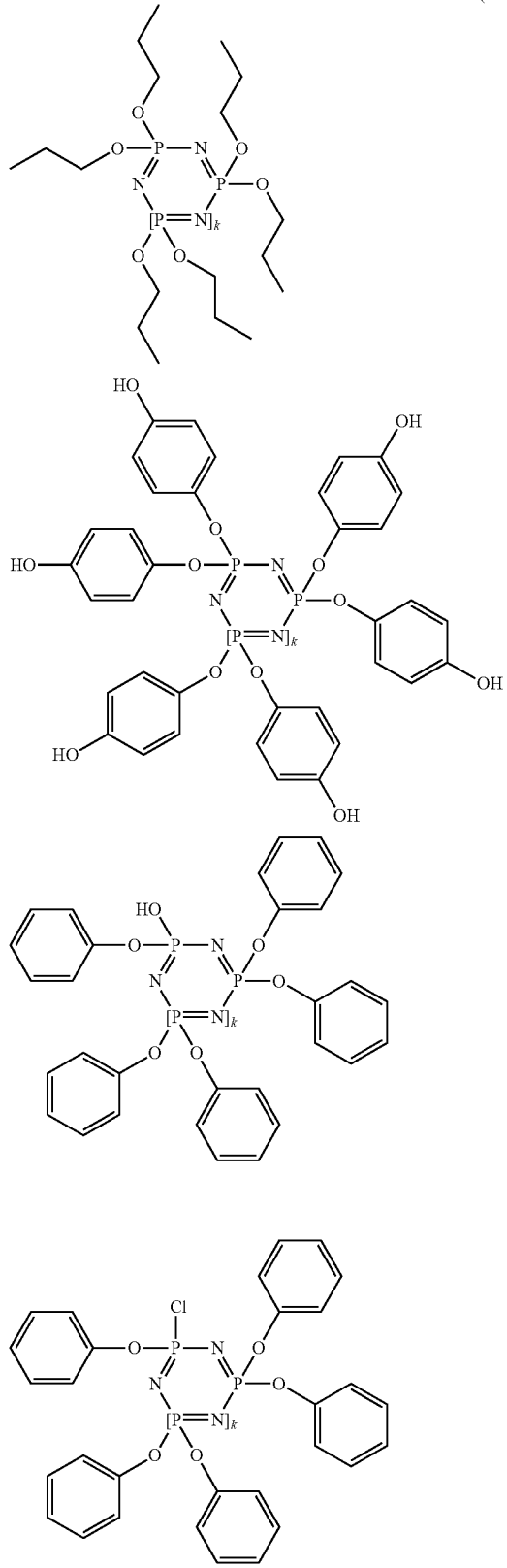

(6a-f)

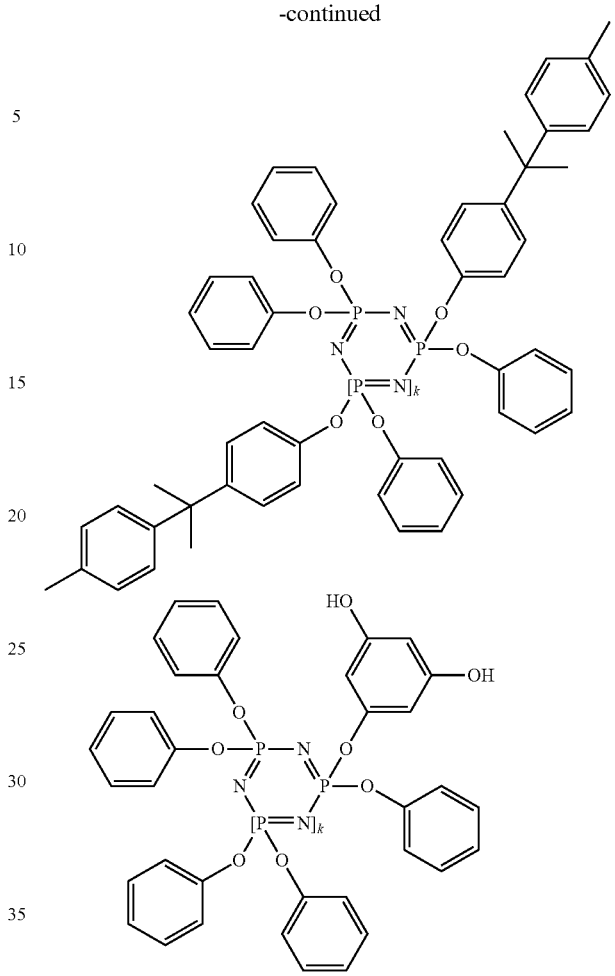

In the compounds 6a-f shown above, k=1, 2 or 3.

Preferably, the proportion of phosphazenes that are halogen-substituted on the phosphorus, for example composed of incompletely reacted starting material, is less than 1000 ppm, further preferably less than 500 ppm.

The phosphazenes can be used alone or in a mixture. The R radical may always be the same or two or more radicals in the formulae may be different. Preferably, the R radicals in a phosphazene are identical.

In a further preferred embodiment, only phosphazenes with the same R are used.

In a preferred embodiment, the proportion of the tetramers (k=2) is from 2 to 50 mol %, based on component B, further preferably from 5 to 40 mol %, even more preferably from 10 to 30 mol %, especially preferably from 10 to 20 mol %.

In a preferred embodiment, the proportion of the higher oligomeric phosphazenes (k=3, 4, 5, 6 and 7) is from 0 to 30 mol %, based on component B, further preferably from 2.5 to 25 mol %, even more preferably from 5 to 20 mol % and especially preferably 6-15 mol %.

In a preferred embodiment, the proportion of the oligomers with k≥8 is from 0 to 2.0 mol %, based on component B, and preferably from 0.10 to 1.00 mol %.

In a further-preferred embodiment, the phosphazenes of component B fulfil all three aforementioned conditions with regard to the proportions of oligomers.

Particular preference is given to phenoxyphosphazene (all R=phenoxy, formula 6g), on their own or with other phosphazenes of formula (1) as component B, having a proportion of oligomers with k=1 (hexaphenoxyphosphazene) of 50 to 98 mol %, more preferably 70 to 72% by weight, based on component B. If phenoxyphosphazene is used, most preferably, the proportion of oligomers with k=2 is 15% to 20% by weight and that of oligomers with k≥3 is 11% to 13% by weight.

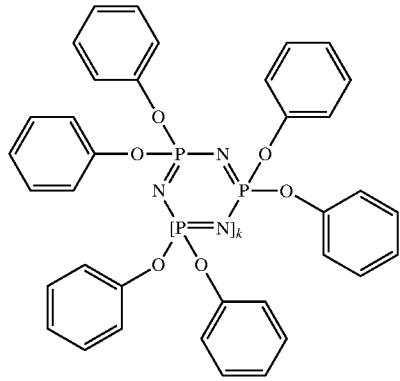

(6g)

Alternatively, more preferably, component B is a phenoxyphosphazene having a trimer content (k=1) of 70 to 85 mol %, a tetramer content (k=2) of 10 to 20 mol %, a proportion of higher oligomeric phosphazenes (k=3, 4, 5, 6 and 7) of 3 to 8 mol % and a phosphazene oligomer with k≥8 of 0.1 to 1 mol %, based on component B.

In an alternative embodiment, n, defined as the arithmetic mean of k, is in the range from 1.10 to 1.75, preferably from 1.15 to 1.50, further preferably from 1.20 to 1.45 and more preferably from 1.20 to 1.40 (including range limits).

$$n = \frac{\sum_{i=1}^{max} k_i \cdot x_i}{\sum_{i=1}^{max} x_i} \qquad (7)$$

The phosphazenes and preparation thereof are described, for example, in EP 728 811 A2, DE 1961668 A and WO 97/40092 A1.

The oligomer compositions in the respective blend samples, even after compounding, can be detected and quantified by means of $^{31}P$ NMR (chemical shift; δ trimer: 6.5 to 10.0 ppm; δ tetramer: −10 to −13.5 ppm; δ higher oligomers: −16.5 to −25.0 ppm).

The polycarbonate-based compositions used in accordance with the invention contain 7% by weight to 15% by weight of cyclic phosphazene, preferably 7% by weight to 12% by weight, more preferably 8% by weight to 10% by weight, most preferably 8.00% by weight to 10.00% by weight, especially up to 9% by weight.

Component C

Components C are phosphorus compounds of the general formula (2)

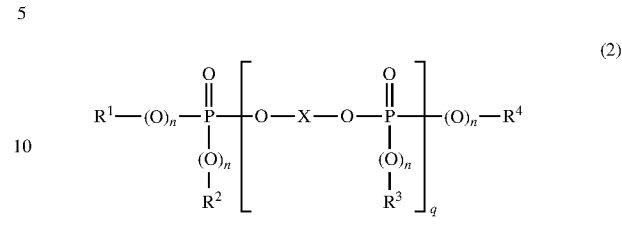

where $R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30 and X is a mono- or polycyclic aromatic radical having 6 to 30 carbon atoms or a linear or branched aliphatic radical having 2 to 30 carbon atoms, each of which may be substituted or unsubstituted, and bridged or unbridged.

Preferably, $R^1$, $R^2$, $R^3$ and $R^4$ are independently branched or unbranched $C_1$- to $C_4$-alkyl, phenyl, naphthyl or $C_1$- to $C_4$-alkyl-substituted phenyl. In the case of aromatic $R^1$, $R^2$, $R^3$ and $R^4$ groups, these may in turn be substituted by halogen and/or alkyl groups, preferably chlorine, bromine and/or $C_1$- to $C_4$-alkyl, branched or unbranched. Particularly preferred aryl radicals are cresyl, phenyl, xylenyl, propylphenyl or butylphenyl, and the corresponding brominated and chlorinated derivatives thereof.

X in the formula (2) preferably derives from dihydroxyaryl compounds. X in formula (2) is more preferably

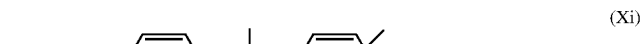

(Xi)

(Xii)

(Xiii)

(Xiv)

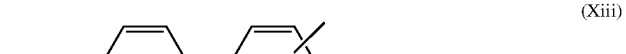

or the chlorinated and/or brominated derivatives thereof. Preferably, X (together with the adjoining oxygen atoms) derives from hydroquinone, bisphenol A or diphenylphenol.

Likewise preferably, X derives from resorcinol. More preferably, X derives from bisphenol A.

n in the formula (2) is preferably 1.

q is preferably 0 to 20, more preferably 0 to 10, and in the case of mixtures has average values of 0.8 to 5.0, preferably 1.0 to 3.0, more preferably 1.05 to 2.00, and especially preferably of 1.08 to 1.60.

40° C. in a mixture of acetonitrile and water (50:50) and using this to calculate the mean values of q.

Particular preference is given to oligophosphates of the formula (2b) in which q is from 0 to 5, most preferably from 1.0 to 1.2.

Most preferred as component D is bisphenol A-based oligophosphate of formula (2b) with q=1.1.

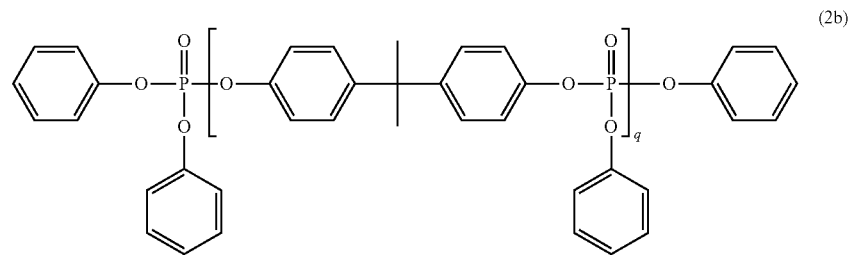

(2b)

A phosphorus compound of the general formula (2) which is present with preference is a compound of the formula (2a)

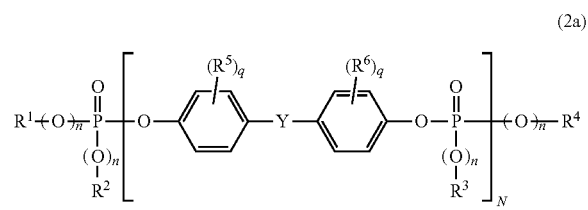

(2a)

where $R^1$, $R^2$, $R^3$ and $R^4$ are each independently a linear or branched $C_1$- to $C_8$-alkyl radical and/or optionally linear or branched alkyl-substituted $C_5$- to $C_6$-cycloalkyl radical, $C_6$- to $C_{10}$-aryl radical or $C_7$- to $C_{12}$-aralkyl radical, n is independently 0 or 1, q is independently 0, 1, 2, 3 or 4, N is a number from 1 to 30, $R_5$ and $R_6$ are independently a linear and branched $C_1$- to $C_4$-alkyl radical, preferably methyl radical, and Y is linear or branched $C_1$- to $C_7$-alkylidene, a linear or branched $C_1$- to $C_7$-alkylene radical, $C_5$- to $C_{12}$-cycloalkylene radical, $C_5$- to $C_{12}$-cycloalkylidene radical, —O—, —S—, —SO—, $SO_2$ or —CO—.

Phosphorus compounds of the formula (2) are especially tributyl phosphate, triphenyl phosphate, tricresyl phosphate, diphenyl cresyl phosphate, diphenyl octyl phosphate, diphenyl 2-ethylcresyl phosphate, tri(isopropylphenyl) phosphate, resorcinol-bridged oligophosphate and bisphenol A-bridged oligophosphate. The use of oligomeric phosphoric esters of the formula (2) which derive from bisphenol A is especially preferred.

Preferably, mixtures having the same structure and different chain length are used, in which case the q value reported is the mean q value. The mean q value is determined by determining the composition of the phosphorus compound mixture (molecular weight distribution) by means of high-pressure liquid chromatography (HPLC) at The phosphorus compounds according to component C are known (cf., for example, EP 363 608 A1, EP 640 655 A2) or can be prepared in an analogous manner by known methods (e.g. Ullmanns Enzyklopädie der technischen Chemie [Ullmann's Encyclopedia of Industrial Chemistry], vol. 18, p. 301 ff. 1979; Houben-Weyl, Methoden der organischen Chemie, vol. 12/1, p. 43; Beilstein vol. 6, p. 177).

The compositions used in accordance with the invention contain 0 to 11% by weight, preferably 4% to 10% by weight, more preferably 5% to 7% by weight, more preferably still 5.00% to 7.00% by weight, of phosphorus compound according to component C, most preferably bisphenol A-based oligophosphate of formula (2b), especially where q=1.0 to 1.2, based on the overall composition.

The amount of components B and C added in total is at least 14% by weight, preferably at least 15% by weight, based on the overall composition.

Component D

As well as the polycarbonate, the compositions may also comprise standard additives such as flame retardants, thermal stabilizers, UV stabilizers, IR absorbers, antioxidants, demoulding agents, flow auxiliaries, antistats, impact modifiers, colourants and/or fillers as further additives. Suitable customary additives for polycarbonate compositions are described, for example, in the "Additives for Plastic Handbook", John Murphy, Elsevier, Oxford 1999 or in the "Plastics Additives Handbook", Hans Zweifel, Hanser, Munich 2001.

"Further additives" do not include any cyclic phosphazene of formula (1) or any phosphorus compound of the general formula (2), since these are already described as components B and C.

The compositions used in accordance with the invention may comprise, as further flame retardant, at least one organic flame retardant salt selected from the group consisting of alkali metal and/or alkaline earth metal salts of aliphatic and aromatic sulfonic acid, sulfonamide and/or sulfonimide derivatives, more preferably in an amount up to 1% by weight, most preferably in an amount up to 0.2% by weight.

Preference is given to using sodium or potassium perfluorobutanesulfonate, sodium or potassium perfluorooctanesulfonate, sodium or potassium diphenylsulfonesulfonate. Preference is further given to potassium nonafluorobutane-1-sulfonate and sodium or potassium diphenylsulfonesulfonate. Potassium nonafluoro-1-butanesulfonate is commercially available, inter alia as Bayowet® C4 (from Lanxess, Leverkusen, Germany, CAS No. 29420-49-3), RM64 (from Miteni, Italy) or as 3M™ perfluorobutanesulfonyl fluoride FC-51 (from 3M, USA). Mixtures of the salts mentioned are likewise suitable. Potassium nonafluoro-1-butanesulfonate is used with particular preference.

Preferably, the compositions according to the invention do not comprise any further flame retardants aside from those mentioned above. The compositions according to the invention are free of anti-dripping agents, such as fluorine-containing anti-dripping agents, for instance of PTFE (polytetrafluoroethylene) or coated PTFE/SAN (styrene-acrylonitrile).

The compositions for the matrix material are free of talc. More preferably, compositions do not contain any inorganic fillers at all.

The amount of further additives is 0% to 10% by weight, preferably up to 5% by weight, more preferably 0.01% to 3% by weight, based on the overall composition.

The polycarbonate compositions comprising components A to C and optionally D are produced by standard methods of incorporation by combining, mixing and homogenizing the individual constituents, and the homogenization in particular preferably takes place in the melt with application of shear forces. The combining and mixing prior to the melt homogenization is preferably effected using powder premixes.

It is also possible to use premixes of pellets or pellets and powders with the polycarbonates.

Also usable are premixes that have been produced from solutions of the mixture components in suitable solvents, in which case it is optionally possible to homogenize in solution and to remove the solvent thereafter.

In particular, additives for the composition according to the invention can be introduced into the polycarbonate by known methods or as a masterbatch.

In this context, the composition according to the invention can be combined, mixed, homogenized, and then extruded in standard apparatuses such as screw extruders (for example twin-screw extruders (TSE)), kneaders or Brabender or Banbury mills After extrusion, the extrudate can be cooled and comminuted. It is also possible to premix individual components and then to add the remaining starting materials singly and/or likewise in a mixture.

Fibre Material

There may be a wide variety of different chemical structures of the fibres of the fibre material. The fibre materials have a higher softening or melting point than the thermoplastic material present in each case.

The fibre material used has preferably been coated with suitable sizes.

The fibre material is preferably in the form of a weave or knit or in the form of endless fibres, more preferably in the form of endless fibres. According to the invention, the fibre material is preferably ground fibres or chopped glass fibres. In this context, "is in the form" means that it can also be a mixture with other fibre materials. However, the respective fibre material is preferably the only fibre material.

The term "endless fibre" in the context of the invention should be regarded as a delimitation from the short or long fibres that are likewise known to the person skilled in the art. Endless fibres generally extend across the entire length of the layer of fibre composite material. The derivation of the term "endless fibre" is that these fibres are present in wound form on a roll and are unwound and impregnated with plastic during the production of the individual fibre composite material layers, such that, with the exception of occasional fracture or roll changing, their length typically corresponds essentially to the length of the fibre composite material layer produced.

Examples of fibre materials are inorganic materials such as a wide variety of different kinds of silicatic and nonsilicatic glasses, carbon, basalt, boron, silicon carbide, metals, metal alloys, metal oxides, metal nitrides, metal carbides and silicates, and organic materials such as natural and synthetic polymers, for example polyacrylonitriles, polyesters, ultrahigh-draw polyamides, polyimides, aramids, liquid-crystalline polymers, polyphenylene sulfides, polyether ketones, polyether ether ketones, polyetherimides. Preference is given to high-melting materials, for example glasses, carbon, aramids, basalt, liquid-crystal polymers, polyphenylene sulfides, polyether ketones, polyether ether ketones and polyether imides. Particularly preferred fibre materials are glass fibres or carbon fibres, in the form of endless fibres and in the form of weaves and knits, particular preference being given to endless glass fibres or endless carbon fibres. The endless fibres especially extend essentially across the entire length of the layer of fibre composite material.

"Unidirectional" in the context of the invention is that the endless fibres are aligned essentially unidirectionally, i.e. point in one direction in terms of their length and hence have the same running direction. "Essentially unidirectional" means here that a deviation in the fibre running direction of up to 5% is possible. Preferably, however, the deviation in the fibre running direction is well below 3%, more preferably well below 1%.

A layer of fibre material, also referred to as fibre layer, is understood to mean a flat layer which is formed by fibres arranged essentially in a plane. The fibres may be bonded to one another by virtue of their position, for example via a weave-like arrangement of the fibres. In addition, the fibre layer may also include a proportion of resin or another adhesive in order to bind the fibres to one another. The fibres may alternatively also be unbonded. This is understood to mean that the fibres can be detached from one another without expenditure of any significant force. The fibre layer may also have a combination of bonded and unbonded fibres. At least one side of the fibre layer is embedded into the polycarbonate-based compositions used in accordance with the invention as matrix material. This is understood to mean that the fibre layer is surrounded at least on one side, preferably on both sides, by the polycarbonate-based composition. The outer edge of the fibre composite material or of the multilayer composite material is preferably formed by the matrix composed of polycarbonate-based composition.

Preferred Properties of the Composite Material

In the case of endless fibres as fibre material, the inner layers of fibre composite material may have essentially the same orientation and the orientation thereof relative to the outer layers of fibre composite material may be rotated by 30° to 90°, wherein the orientation of one layer of fibre composite material is determined by the orientation of the unidirectionally aligned fibres present therein.

In a preferred embodiment, the layers are arranged in alternation. In this case, the outer layers are in a 0° orientation. It has been found to be of particular practical relevance when the inner layers of fibre composite material have the same orientation and their orientation is rotated by 90° relative to the outer layers of fibre composite material. Alternatively, it is possible to rotate the inner layers by 30°, 40°, 50°, 60°, 70° or 80° relative to the outer layer. The orientation in each case may deviate from the guide values mentioned by ±5°, preferably by ±3°, more preferably by ±1°. "Alternating" means that the inner layers are each arranged in an alternating manner by an angle of 90° or an angle of 30° to 90°. The outer layers are in a 0° orientation in each case. The angles may each be varied from 30° to 90° per layer.

In a further preferred embodiment, at least some of the layers have the same orientation and at least some other layers are rotated by 30° to 90°. In this case, the outer layers are in a 0° orientation.

In a further preferred embodiment, the inner layers have the same orientation and their orientation is rotated by 30° to 90° relative to the outer layers of fibre composite material, and the outer layers are present in a 0° orientation relative thereto.

These preferred embodiments are especially suitable for endless fibres.

In the case of weaves, the layers of fibre composite materials are stacked alternately in warp direction (0°) and weft direction (90°), or at the above-specified angles.

In particular embodiments, the multilayer composite material comprises six, preferably five, especially four, more preferably three, inner layers of fibre composite material. However, the multilayer composite material according to the invention may also comprise two or more than six, for example seven, eight, nine, ten or more than ten inner fibre composite material layers.

There is in principle no limit to the number of fibre layers in a layer of fibre composite material. It is therefore also possible for two or more fibre layers to be arranged one on top of another. Two fibre layers one on top of another may each be embedded individually into the matrix material, such that they are each surrounded by the matrix material on either side. In addition, two or more fibre layers may also lie directly one on top of another, such that their entirety is surrounded by the matrix material. In this case, these two or more fibre layers may also be regarded as one thick fibre layer. In one embodiment of the fibre composite material, the fibre layer takes the form of a unidirectional fibre layer, of a woven fabric or laid scrim layer, of a loop-drawn knit, loop-formed knit or braid, or of long fibres in the form of random fibre mats or nonwoven tapes, or combinations thereof.

A preferred embodiment of a multilayer composite material according to the invention comprises eight layers, and thus two outer and six inner layers. The inner layers comprise unidirectionally oriented endless fibres as fibre material, preferably carbon fibres. The two outer layers of the inner layers have a 0° orientation. The four innermost layers of the inner layers all have the same orientation and are rotated by 90° thereto. Applied as the outer layer in each case is a layer of composite material which, rather than unidirectionally oriented endless fibres, comprises a fibre weave. The matrix material of the inner layers of the composite material is a composition as described above, especially one emphasized as preferred. More preferably, the matrix material of all the layers of fibre composite material having endless fibres is the same. The fibre volume content in the six inner layers of composite material is preferably 40%-50% by volume and is preferably the same in these layers.

The multilayer composite materials according to the invention can have a metallic appearance, metallic sound and metallic tactile properties, and metal-like mechanical properties. The multilayer composite materials of the invention also have the advantage that they can be produced inexpensively and that they are extremely lightweight because of the plastic used therein. What is also advantageous about the multilayer composite materials according to the invention is that the configuration, for example of a housing part, can be effected in a particularly simple and flexible manner owing to the thermoformability of the multilayer composite materials.

In one particular embodiment of the invention, all fibre composite material layers of the multilayer composite material are bonded face-to-face, wherein the fibre material is aligned unidirectionally within the respective layer and is embedded in the matrix material. It is optionally possible, in this embodiment, for further material layers to be present between the layers of the fibre composite material, for example finishing layers, for example paint layers, typically based on urethane-based and acrylate-based paint systems, in single-layer or multilayer form, which can be hardened thermally or by means of UV radiation (the surfaces, prior to finishing, can optionally be correspondingly pretreated, activated, for example by means of plasma or flame treatment, or cleaned). It is also possible for thin films to be applied to one or both sides of a multilayer construct composed of several layers of composite material each with unidirectionally oriented fibres as fibre material, in order to provide a particularly homogeneous surface for subsequent painting. These films may or may not have been rendered flame-retardant.

In a further preferred embodiment, veneer is applied as outer layer on one or both sides of the multilayer construct.

In principle, the multilayer composite material according to the invention, as well as the layers of fibre composite material, may also comprise one or more further layers. Examples of these include further layers of a plastic which may be identical to or different from the plastics matrix used in the layers of fibre composite material. These plastics layers may in particular also comprise fillers which are distinct from the fibre materials provided in accordance with the invention. The multilayer composite material according to the invention may additionally also comprise adhesive layers, woven layers, nonwoven layers or surface enhancement layers, for example paint layers. These further layers may be present between inner and outer layers of fibre composite material, between a plurality of inner layers of fibre composite material and/or atop one or both of the outer layers of fibre composite material. However it is preferable when the outer layers of fibre composite material and the at least one inner layer of fibre composite material are bonded to one another such that there are no further layers therebetween.

The multilayer composite material may also be composed exclusively of fibre composite material layers according to the invention in which the fibres are unidirectionally aligned within the respective layer and embedded into a polycarbonate-based plastics matrix, wherein one or more surface enhancement layers, for example paint layers, may optionally be present atop one or both of the outer layers of fibre composite material.

The individual layers of fibre composite material may have a substantially identical or different construction and/or orientation.

A "substantially identical construction" of the layers of fibre composite material is understood in the context of the invention to mean that at least one feature from the group comprising chemical composition, fibre volume content and layer thickness is identical.

"Chemical composition" is understood to mean the chemical composition of the polymer matrix of the fibre composite material and/or the chemical composition of the fibre material, such as endless fibres.

In a preferred embodiment of the invention, the outer layers of fibre composite material have a substantially identical construction in terms of their composition, their fibre volume content and their layer thickness.

In a preferred embodiment of the invention, the multilayer composite material has a total thickness of 0.5 to 2 mm, preferably 0.7 to 1.8 mm, especially 0.9 to 1.2 mm. Practical tests have shown that the multilayer composite material according to the invention can achieve excellent mechanical properties even at these low thicknesses.

It has been found to be particularly advantageous when the sum total of all inner layers of fibre composite material has a total thickness of 200 µm to 1200 µm, preferably 400 µm to 1000 µm, more preferably 500 µm to 750 µm.

It is further advantageous in the context of the invention when the thickness of each of the two outer layers of fibre composite material is 100 to 250 µm, preferably 120 µm to 230 µm, more preferably 130 µm to 180 µm.

Fibre composite material layers that are preferred in accordance with the invention have a fibre volume content of ≥30% by volume and ≤60% by volume, preferably ≥35% by volume and ≤55% by volume, more preferably of ≥37% by volume and ≤52% by volume. If the fibre volume content is less than 30% by volume then the mechanical properties of the resulting fibre composite material under a point load are often suboptimal, i.e. the fibre composite material cannot adequately withstand a point load and in some cases is even pierced. A fibre volume content exceeding 60% by volume likewise results in a deterioration in the mechanical properties of the fibre composite material. Without wishing to be bound to any scientific theories, the reason for this seems to be that the fibres can no longer be adequately wetted in impregnation at such high fibre volume contents, leading to an increase in air inclusions and to increased occurrence of surface defects in the fibre composite material.

In one embodiment of the multilayer composite material, the volume content of the fibre material in the total volume of the multilayer composite material is in the range from 30% to 60% by volume, preferably in the range of 40% to 55% by volume.

In one embodiment of the invention, the outer layers of fibre composite material have a fibre volume content of not more than 50% by volume, preferably not more than 45% by volume, especially not more than 42% by volume.

In a particular embodiment of the invention, the outer layers of fibre composite material have a fibre volume content of at least 30% by volume, preferably at least 35% by volume, especially at least 37% by volume.

These upper and lower limits for the fibre volume content are associated with particularly advantageous mechanical properties as described further up. They can be combined with other stated properties of the fibre composite material or multilayer composite material.

In a further particular embodiment of the invention, the outer layers of fibre composite material have a lower volume content of fibres, based on the total volume of the layer of fibre composite material, than the at least one inner layer of fibre composite material.

The inner layers of fibre composite material can have a fibre volume content of 40% to 60% by volume, preferably 45% to 55% by volume, more preferably 48% to 52% by volume, based on the total volume of the layer of fibre composite material.

"% by volume" is understood here to mean the proportion by volume (% v/v), based on the total volume of the layer of fibre composite material.

The preferably at least three layers of fibre composite material in the multilayer composite material according to the invention preferably have essentially no voids, in particular essentially no air inclusions.

"Essentially no voids" in one embodiment means that the void content of the at least three layers of fibre composite material in the multilayer composite material according to the invention is below 2% by volume, in particular below 1% by volume, more preferably below 0.5% by volume.

The void content of a layer of fibre composite material or of the multilayer composite material can be determined in different ways which are regarded as generally accepted. For example, the void content of a test specimen can be determined by the resin ashing test, in which a test specimen is exposed for example to a temperature of 600° C. for 3 hours in an oven in order to incinerate the resin which encloses the fibres in the test specimen. The mass of the fibres thus exposed can then be determined in order to arrive after a further computational step at the void content of the test specimen. Such a resin ashing test can be performed as per ASTM D 2584-08 to determine the individual weights of the fibres and of the polymer matrix. The void content of the test specimen can be determined therefrom in a further step by utilizing the following equation 1:

$$Vf = 100 * (\rho t - \rho c)/\rho t \qquad \text{(equation 1)}$$

where

Vf is the void content of the sample in [%];

ρc is the density of the test specimen, determined by liquid or gas pycnometry for example;

ρt is the theoretical density of the test specimen determined as per the following equation 2:

$$\rho t = 1/[Wf/\rho f + Wm/\rho m] \qquad \text{(equation 2)}$$

ρm is the density of the polymer matrix (for example for an appropriate crystallinity);

ρf is the density of the fibres used;

Wf is the proportion by weight of the fibres used and

Wm is the weight fraction of the polymer matrix.

Alternatively, the void content can be determined by chemical leaching of the polymer matrix out of the test specimen as per ASTM D 3171-09. The resin ashing test and the chemical dissolution method are more suitable for glass fibres which are generally inert to melting or chemical treatment. Further methods for more sensitive fibres are indirect computation of the void content by the densities of the polymer, of the fibres and of the test specimen as per ASTM D 2734-09 (method A), wherein the densities can be determined as per ASTM D792-08 (method A). Furthermore, it is also possible to employ image processing programs, grid templates or defect counting to evaluate the void content of an image recording determined by conventional microscopy.

A further way to determine void content is the thickness differential method which comprises determination of the differential in layer thickness between a theoretical component thickness and the actual component thickness for known basis weights and densities of polymer and fibre. Computation of the theoretical component thicknesses assumes no voids are present in the construction and complete wetting of the fibres with polymer. Relating the thickness difference to the actual component thickness affords the percentage void content. These thicknesses may be measured with a micrometer for example. For this method, error-minimized results can preferably be determined by determining the void content on components composed of a plurality of individual layers, preferably more than 4 layers, more preferably more than 6 layers and very particularly preferably more than 8 layers.

All the processes described above lead to comparable results when a corresponding standard is tested as well.

Most preferably, the layers of fibre composite material in the multilayer composite material according to the invention have no voids, especially no inclusions of air.

Production of the Fibre Composite Materials and the Multilayer Composite Materials The invention further provides a process for producing the fibre composite material according to the invention or the multilayer composite material.

The fibre composite material layers of the multilayer composite material according to the invention can be produced by the customary processes for producing fibre composite materials that are known to one skilled in the art.

For the production of the fibre composite materials or multilayer composite materials according to the invention, it is possible to use various production methods. First of all, it is possible to make a fundamental distinction as to whether the fibre composite material or the multilayer composite material consists, for example, of unidirectional fibre layers, weave layers, random fibre layers or of combinations thereof, it being possible to introduce unidirectional fibres into the composite material layers either in the form of a semifinished product (e.g. laid scrim) or directly as a pure fibre strand. In the case of the latter approach, the fibre strands are generally first impregnated at least in one layer with the thermoplastic resin (the fibre composite material), in order then to be pressed to form a multilayered system (laminate), the multilayer composite material, for which there are various methods of impregnation. If the composite sheet is produced from semifinished fibre products (weaves, scrims, random fibres etc.), the prior art likewise indicates various means by which fibres and matrix can be combined. Standard methods are, for example, the process with the aid of powder prepregs or what is called the film stacking process. The film stacking process can preferably be used for the production of the above-described fibre composite materials. This involves alternate layering of films and weave layers, where the basis weight of the weave and thickness of the films, for example, can be matched to one another so as to obtain a desired fibre volume content.

In a preferred embodiment of the invention, the fibre composite material layers of the multilayer composite material are producible by applying a molten polycarbonate-based plastic to an endless fibre tape preheated to above the glass transition temperature of the plastic under pressure-shear vibration. Such a production process is described in DE 10 2011 005 462 B3.

An "endless fibre tape" is understood in accordance with the invention to mean a plurality of rovings that have been brought together, the rovings being untwisted bundles composed of many endless fibres.

The preferred process for producing a layer of fibre composite material of the multilayer composite material especially comprises the following steps:
  providing an endless fibre tape and conveying the endless fibre tape along a processing line,
  preheating the endless fibre tape to a processing temperature higher than the glass transition temperature of the polycarbonate-based plastic,
  applying the molten polycarbonate-based plastic over an entire width of the endless fibre tape onto one surface of the endless fibre tape,
  applying a pressure on to the endless fibre tape perpendicular to the plane of the tape after the application of the polycarbonate-based plastic, wherein the application of pressure is effected with at least one pressing ram with simultaneous application of shear vibration to the pressing ram with a vibratory motion component in the tape plane and transverse to a tape running direction,
  holding the endless fibre tape within a processing temperature range above the glass transition temperature of the polycarbonate-based plastic at least until the application of pressure-shear vibration has been terminated.

Melt application with the following application of pressure-shear vibration for as long as the raw fibre tape is at a temperature above the glass transition temperature of the polycarbonate-based plastic results in an efficacious incorporation of the plastics melt into the entire fibre volume structure of the raw fibre tape.

It is preferable not to exceed an endless fibre tape temperature of 380° C. The temperature of the endless fibre tape is typically between 180° C. and 280° C., preferably between 200° C. and 260° C., more preferably to 240° C., especially preferably between 210° C. and 230° C., in particular 220° C. Where reference is made to heating to above the glass transition temperature of the plastic or holding at above the glass transition temperature of the plastic, this means heating to a temperature at which the plastic is in a fully molten state. The glass transition temperature of the plastic is determined as per DIN EN ISO 11357-2:2014-07 at a heating rate of 20° C./min. A difference between the fibre temperature and the melt temperature on contacting of the plastics melt with the endless fibre tape is in the range from 60° C. to 120° C., preferably from 70° C. to 110° C., more preferably from 80° C. to 100° C.

The application of pressure-shear vibration causes efficient expulsion of gas volumes still present within the raw fibre tape. The process may be performed in continuous fashion. The holding of the endless fibre tape at a temperature above the glass transition temperature of the plastic ensures that the polycarbonate-based plastic does not undergo undesired solidification before complete penetration and apportioning within and atop the endless fibre tape. On conclusion of the pressure-shear vibration, the temperature is preferably still kept above the melting temperature of the polymer during a rest interval. Subsequently, the layer of fibre composite material is cooled down in a defined manner. Once the indicated process steps have been performed the produced, impregnated endless fibre tape can be cooled in a defined manner.

The endless fibre tape may comprise a multiplicity of endless fibres. The application of pressure-shear vibration makes it possible to achieve good penetration of the plastic into the fibre tape, i.e. good impregnation, with little, if any, damage to the fibres.

The process can be performed continuously or batchwise.

It is particularly preferable when the process for producing a layer of fibre composite material of the multilayer composite material is run such that the application of the polycarbonate-based plastic to the endless fibre tape is effected while the endless fibre tape is conveyed under ambient atmospheric pressure. Such an application of the plastic avoids complex and inconvenient external sealing of a pressurized application chamber.

It is further preferable to run the process for producing a fibre composite material layer of the multilayer composite material such that the application of pressure-shear vibration to a section of the endless fibre tape after the application of plastic is effected consecutively and repeatedly along the processing line. It is also possible to run the process such that the pressure-shear vibration to a section of the endless fibre tape after plastic is applied from both sides of the tape plane. Repeated application of pressure-shear vibration increases the efficiency of the production process. Transverse motion components of the various devices for application of pressure-shear vibration may be controlled in synchronized opposing fashion, i.e. in a push-pull manner A rest interval where the raw fibre tape does not have a pressure and/or shear vibration applied to it for a predefined time interval may in each case be provided in a targeted fashion between the consecutive applications of pressure-shear vibration. An application of pressure-shear vibration from both sides may be effected by way of pressure application devices arranged consecutively in the processing line. Alternatively, a simultaneous application of pressure-shear vibration from both sides is possible. The application of pressure-shear vibration from both sides can also be effected with the transverse motion components occurring in synchronized opposing fashion, i.e. in a controlled push-pull manner.

The frequencies of the application of pressure-shear vibration are preferably in the range between 1 Hz and 40 kHz. Amplitudes for the application of shear vibration are typically in the range between 0.1 mm and 5 mm. A pressure of the application of pressure-shear vibration is preferably in the range between 0.01 MPa and 2 MPa.

"Bonding of the layered layers of fibre composite material" is understood in accordance with the invention to mean any process which results in physical bonding of the layered layers of fibre composite material. It is preferable when the bonding of the layered layers of fibre composite material to afford the multilayer composite material is effected by means of pressure and/or temperature, for example by lamination. The pressure employed for bonding of the layered layers of fibre composite material to afford the multilayer composite material may be in the range from 5 to 15 bar, preferably 7 to 13 bar, more preferably 8 to 12 bar. The temperature for bonding of the fibre composite material layers may be 80° C. to 300° C. If a bonding process with heating and cooling zones is employed the temperature for bonding of the fibre composite material layers in the heating zones may be from 220° C. to 300° C., preferably from 230° C. to 290° C., more preferably from 240° C. to 280° C. The temperature in the cooling zones may be from 80° C. to 140° C., preferably from 90° C. to 130° C., more preferably from 100° C. to 120° C.

However, in addition to lamination, adhesive bonding or welding to bond the layered layers of fibre composite material are also possible.

In a preferred embodiment, the bonding of the layered layers of fibre composite material results in layers of fibre composite material bonded face-to-face. "Face-to-face" in this context means that at least 50%, preferably at least 75%, 90%, 95%, 99% or 100% ("uniform" bonding) of the surfaces of two adjacent layers of the fibre composite material that are facing one another are directly bonded to one another. The degree of bonding may be determined in cross sections by microscopy or else determined by the absence of cavities, for example air inclusions, in the fibre composite material.

A preferred process for producing an inventive multilayer composite material composed of at least three inventive layers of fibre composite material comprises the following steps:
  providing at least one inner layer of fibre composite material and two outer layers of fibre composite material, wherein the individual layers of fibre composite material are produced by applying a molten, aromatic polycarbonate-based composition comprising a composition as described above to a raw fibre tape composed of fibre material that has been preheated to above the glass transition temperature of the polycarbonate,
  layering the layers of fibre composite material in the desired orientation relative to one another, based on the orientation of the fibre material,
  bonding the layered layers of fibre composite material to form the multilayer composite material.

Multilayer composite materials can additionally also be produced by means of a static press. This involves alternate layering of films composed of the polycarbonate-based compositions used in accordance with the invention and the weave layers, where the outer layers are each concluded by a film layer.

It is possible to use the inventive layers of fibre composite material to produce broad layers of fibre composite material for demanding fibre composite components where drawing freedom across the entire area is required, especially for bodywork components in motor vehicles. "Broad layers of fibre composite material" means here that the layers of fibre composite material can reach a width of several metres. Typically, the broad layers of fibre composite material have widths of 280 mm to 1800 mm.

An advantageous process for producing very broad layers of fibre composite material is described in WO 2013/098224 A1. This process enables the production of a fibre tape of maximum homogeneity across the entire width in terms of its properties. For this purpose, two or more individual fibre tapes of a defined width, each of which has a filament structure impregnated with the polymer, are combined in a heated pressurization unit, wherein the individual fibre tapes are conveyed alongside one another in an entry region into the heated pressurization unit such that adjacent side chains of the consolidated individual fibre tapes abut one another in joint regions, the individual fibre tapes being conveyed alongside one another are then heated with the heated pressurization unit to a temperature above a melting point of the polymer, where the heating is effected across the entire width of the individual fibre tapes transverse (y) to the conveying direction (x) thereof; then pressure is applied with the heated pressurization unit to the heated individual fibre tapes being conveyed alongside one another; subsequently, the consolidated individual fibre tapes are kept within a processing temperature range above the polymer melting point until the joint regions of the consolidated individual fibre tapes are welded to one another, and then the broad fibre tape composed of the mutually welded individual fibre tapes is cooled down.

Preferably, during the heating, shear vibration is applied to the consolidated individual fibre tapes with the heated pressurization unit, with exertion of a shear force on the individual fibre tapes in the longitudinal direction of a shear force application unit (y), which is at right angles to a conveying direction (x) and at right angles to a tape normal (z). This leads to effective homogeneous distribution of the polymer melt into the whole fibre volume structure of the broad fibre tape. Gas volumes that are still within the individual fibre tapes and especially in the joint region of adjacent individual fibre tapes can be efficiently driven out as a result. The application of shear vibration results in spreading of the individual fibre tapes, which improves wetting of the filaments with the molten polymer matrix.

The spreading may be associated with a decrease in the tape thickness of the broad layer of fibre composite materials produced compared to the tape thickness of the individual fibre tapes.

The pressure unit of the heated pressurization unit is preferably a pressing ram or a roll pair, or alternatively an interval heating press, an isobaric twin belt or membrane press, a calender or a combination of these alternatives.

The process described for production of a broad layer of fibre composite material is conducted continuously or batchwise.

A further advantage of the multilayer composite material according to the invention is that it can be formed into any desired shape. Forming may be achieved by any forming processes known to one skilled in the art. Such forming processes may be effected under the action of pressure and/or heat.

Preferably, the forming is effected with evolution of heat, especially by thermoforming.

In order to obtain better compatibility of the fibre layers and especially of the endless fibres with the thermoplastic matrix material, the fibre layers, especially the endless fibres or weaves/knits, can be surface pretreated with a silane compound. Preferred silane compounds are aminopropyltrimethoxysilane, aminobutyltrimethoxysilane, aminopropyltriethoxysilane, aminobutyltriethoxysilane.

Generally, the fibres can be chemically and/or physically modified by means of sizes in such a way as to establish, for example, the desired degree of binding between fibres and the matrix material in the subsequent production of fibre composite materials from the fibre layers and the matrix material. For this purpose, it is possible to use any sizes known to those skilled in the art, specifically not only the abovementioned silane compounds but also preferably the epoxy resins and derivatives thereof, epoxy esters, epoxy ethers, epoxy urethanes, polyurethane esters, polyurethane ethers, isocyanates, polyimides, polyamides, and any desired mixtures of two or more of the aforementioned compounds. The specific selection of the size material depends on the material for the fibres and the desired strength of binding.

The size can be used here, for example, in the form of an aqueous or nonaqueous solution or emulsion, and the size can be attached to the fibres according to the invention by known methods for the sizing of short fibres, for example in a dipping process.

An essential aspect is the fact that the structure-stiffening fibre material and the thermoplastic material enter into a cohesive bond with one another. The cohesive bond is established via the process parameters, especially melt temperature and mould temperature and pressure, and also depends on the abovementioned size.

Preference is given in accordance with the invention to a fibre composite material comprising at least one layer of fibre material embedded into an aromatic polycarbonate-based composition, comprising A) at least 65% by weight of at least one aromatic polycarbonate, B) 7% by weight to 12% by weight of at least one cyclic phosphazene of formula (1)

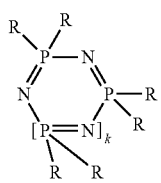

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical, k is an integer from 1 to 10, C) 4% to 10% by weight of at least one phosphorus compound of the general formula (2)

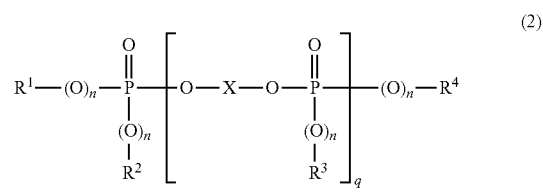

where $R^1$, $R^2$, $R^3$ and $R^4$ are each independently a $C_1$- to $C_8$-alkyl radical, in each case in each case halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged;

D) optionally further additives, and wherein the composition is free of anti-dripping agents and free of talc, wherein a total of at least 14% by weight of component B+component C is present, based on the overall composition and wherein the fibre material used is at least, preferably exclusively, carbon fibres or glass fibres in the form of unidirectionally oriented endless fibres.

Even further preference is given in accordance with the invention to a fibre composite material comprising at least one layer of fibre material embedded into an aromatic polycarbonate-based composition, wherein the composition comprises A) at least 65% by weight of at least one aromatic polycarbonate, B) 7% by weight to 12% by weight of at least one cyclic phosphazene of formula (1)

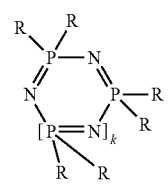

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical, k is an integer from 1 to 10, C) 4% to 10% by weight of at least one phosphorus compound of the general formula (2)

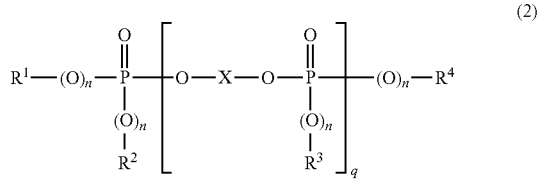

(2)

where $R^1$, $R^2$, $R^3$ and $R^4$ are each independently a $C_1$- to $C_8$-alkyl radical, in each case in each case halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged;

D) optionally further additives, wherein a total of at least 14% by weight of component B+component C is present, based on the overall composition, and wherein the composition is free of anti-dripping agents and is free of inorganic fillers, wherein the fibre material used is at least, preferably exclusively, carbon fibres or glass fibres in the form of unidirectionally oriented endless fibres.

Particular preference is given in accordance with the invention to a fibre composite material comprising at least one layer of fibre material embedded into an aromatic polycarbonate-based composition, wherein the composition consists of A) 75% by weight to 87% by weight of at least one aromatic polycarbonate, B) 8% by weight to 10% by weight of at least one cyclic phosphazene of formula (1) wherein the cyclic phosphazene of component B present is at least phenoxyphosphazene, C) 5% to 7% by weight of at least one phosphorus compound of the general formula (2) wherein the only phosphorus compound of formula (2) present is the phosphorus compound of formula (2b)

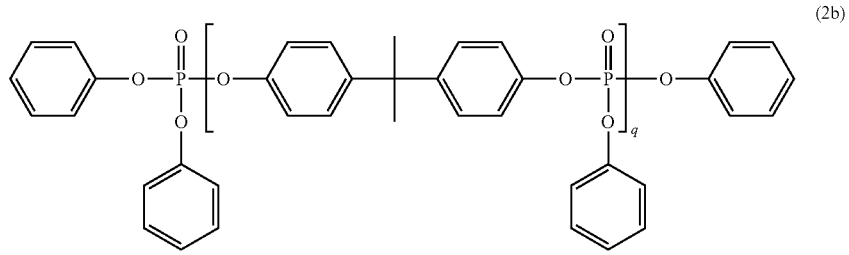

(2b)

with a mean q value of q=1.0 to 1.2,

D) 0% to 10% by weight of one or more further additives, different from components B and C, selected from the group consisting of UV stabilizers, IR absorbers, antioxidants, demoulding agents, flow auxiliaries, antistats, impact modifiers, colourants, thermal stabilizers, further flame retardants, wherein a total of at least 14% by weight of component B+component C is present, based on the overall composition, and wherein the fibre material used is at least, preferably exclusively, carbon fibres or glass fibres, especially carbon fibres, in the form of unidirectionally oriented endless fibres.

More preferably, in the phosphazene, all R radicals=phenoxy radicals; very particular preference is given to using hexaphenoxyphosphazene. The particularly preferred phosphorus compound of component D is

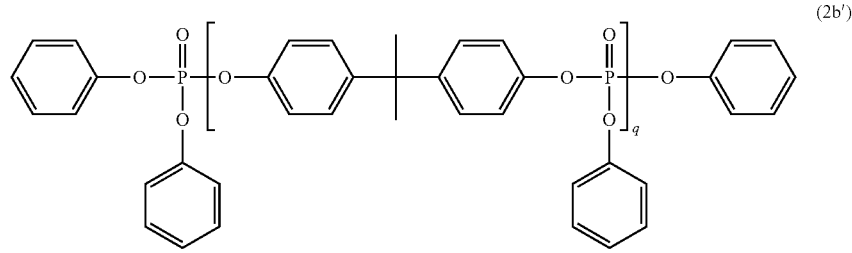

(2b′)

where q is from 1.0 to 1.2.

Very particular preference is therefore given to a fibre composite material comprising at least one layer of fibre material embedded into an aromatic polycarbonate-based composition consisting of:

A) 75% by weight to 87% by weight of at least one aromatic polycarbonate

B) 8% by weight to 10% by weight of at least one cyclic phosphazene of formula (1) wherein the only cyclic phosphazene of component B present is only phenoxyphosphazene, and the proportion of cyclic phosphazene with K=1 is 50 to 98 mol % based on the total amount of cyclic phosphazene of formula (1)

C) 5% to 7% by weight of at least one phosphorus compound of the general formula (2) wherein the only phosphorus compound of formula (2) present is the phosphorus compound of formula (2b)

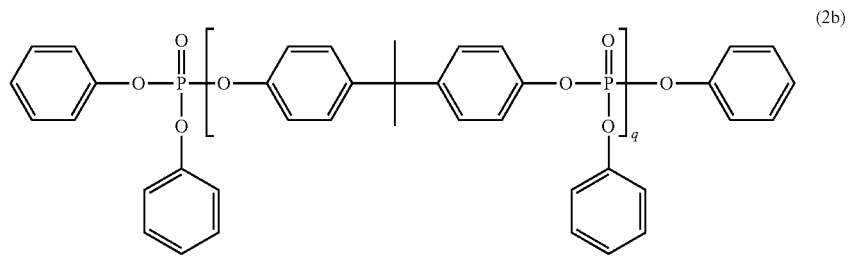

(2b)

with a mean q value of =q=1.0 to 1.2,

D) 0% to 10% by weight of further additives, different from components B and C, selected from the group consisting of UV stabilizers, IR absorbers, antioxidants, demoulding agents, flow auxiliaries, antistats, impact modifiers, colourants, thermal stabilizers, further flame retardants, wherein the fibre material used is at least, preferably exclusively, carbon fibres or glass fibres in the form of unidirectionally oriented endless fibres.

Preference is further given in accordance with the invention to a multilayer composite material comprising at least three mutually superposed layers of fibre composite material as defined above. The fibre volume content of the layers of fibre composite material here is more preferably ≥35% by volume and ≤55% by volume.

The invention further provides a housing or a housing component suitable for use as or employment in a housing of an electronic device, wherein the housing component comprises a multilayer composite material according to the invention.

Housings or housing components obtainable from the composite materials according to the invention—fibre composite materials or multilayer composite materials—are used especially in the IT sector, particularly in computers, ultrabooks, monitors, tablets, phones or mobile phones. For example a housing part may be the back of a mobile phone, the underside of a laptop, the monitor backside of a laptop, the back of a tablet, etc. or else may merely be a constituent of a back of a mobile phone, an underside of a laptop, a monitor backside of a laptop, a back of a tablet, etc. Preferably, the housing component is the monitor backside (a cover) or the underside (d cover) of a laptop. Corresponding housings or housing components can especially be obtained by forming and/or assembly together with further components.

The invention further provides components and structural or trim elements for motor vehicle interiors (walls, cover trim, doors, windows, etc.), parcel shelves, driver's consoles, tables, sound insulation and other insulation materials, vertical surfaces of the outer vehicle skin, outer faces of the underbody, light covers, light diffusers, etc., where the part or structural or trim element comprises a multilayer composite material according to the invention.

Fibre composite materials of the present invention can especially be used for production of thin-wall components (e.g. housing components in data processing, TV housings, laptops, notebooks, ultrabooks), where particularly high demands are made on notched impact resistance, flame retardancy and surface quality of the materials used. Thin-wall mouldings are those where wall thicknesses are less than about 3 mm, preferably less than 3 mm, more preferably less than 2.5 mm, yet more preferably less than 2.0 mm, most preferably less than 1.5 mm. In this context "about" is understood to mean that the actual value does not deviate substantially from the stated value, a "non-substantial" deviation being deemed to be one of not more than 25%, preferably not more than 10%. In this context, wall thickness is the thickness of the wall perpendicularly to the surface of the moulding having the greatest extent, wherein said thickness is present over at least 60%, preferably over at least 75%, further preferably over at least 90%, especially preferably over the entire area.

It is also possible for fibre composite materials according to the invention to be used for production of housing components, for example for domestic appliances, office appliances such as monitors or printers, covering panels for the construction sector, components for the motor vehicles sector or components for the electronics sector.

Figure 2:
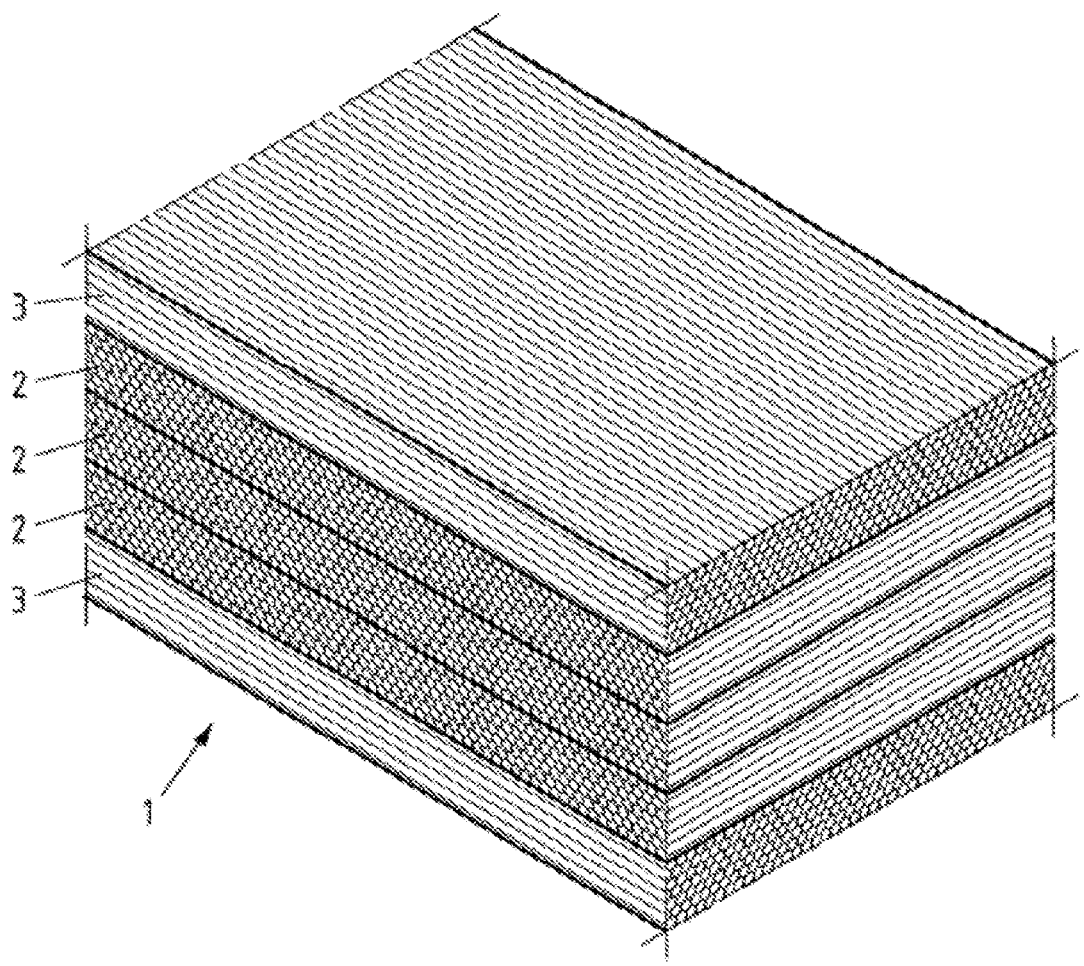
Figure 3:
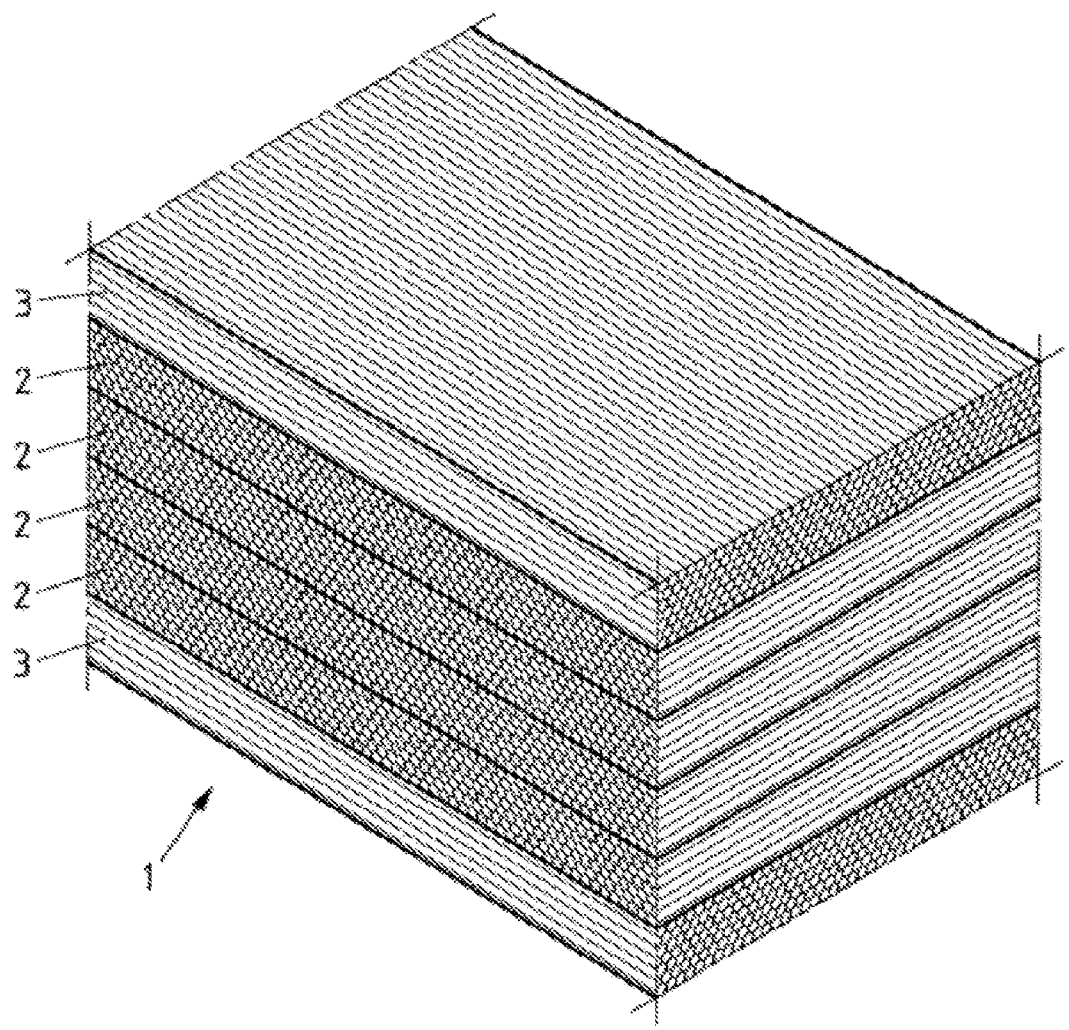

Further details and advantages of the invention will be apparent from the description which follows of the accompanying illustration showing preferred embodiments. The drawings show:

FIG. 1 a schematic and perspective diagram of a multilayer composite material composed of three superposed layers of fibre composite material with enlarged detail, wherein the inner layer is rotated by 90° relative to the outer layers of fibre composite material, FIG. 2 a schematic and perspective diagram of a multilayer composite material composed of five superposed layers of fibre composite material, wherein the inner layers have the same orientation and their orientations are rotated by 90° relative to the outer layers of fibre composite material, FIG. 3 a schematic and perspective diagram of a multilayer composite material composed of six superposed layers of fibre composite material, wherein the inner layers have the same orientation and their orientations are rotated by 90° relative to the outer layers of fibre composite material.

FIG. 1 shows a detail of a multilayer composite material 1 composed of three superposed layers of fibre composite material 2, 3, wherein the inner layer of fibre composite material 2 is rotated by 90° relative to the outer layers 3 of fibre composite material. The enlarged detail in FIG. 1 shows that each of the layers 2, 3 of the multilayer composite material comprises endless fibres 4 which are unidirectionally aligned within the respective layer and are embedded in polycarbonate-based plastic 5. The orientation of the respective layer of fibre composite material 2, 3 is determined by the orientation of the unidirectionally aligned endless fibres 4 present therein. The endless fibres 4 extend over the entire length/width of the multilayer composite material. The layers 2, 3 are uniformly bonded to one another.

The multilayer composite material 1 as per FIG. 2 is composed of five superposed layers of fibre composite material 2, 3, wherein the inner layers of fibre composite material 2 have the same orientation and their orientation relative to the outer layers of fibre composite material 3 is rotated by 90°.

The multilayer composite material 1 as per FIG. 3 is composed of six superposed layers of fibre composite material 2, 3, wherein the inner layers of fibre composite material 2 have the same orientation and their orientation relative to the outer layers of fibre composite material 3 is rotated by 90°.

WORKING EXAMPLES

There follows a detailed description of the invention with reference to working examples, and the methods of determination described here are employed for all corresponding parameters in the present invention, in the absence of any statement to the contrary.

Starting Materials:
A-1: Polycarbonate from Covestro Deutschland AG. Linear polycarbonate based on bisphenol A having a melt volume flow rate MVR of 6 cm$^3$/(10 min) (as per ISO 1133:2012-03, at a test temperature of 300° C. and 1.2 kg load).
A-2: Makrolon® 3108 powder from Covestro Deutschland AG. Linear polycarbonate based on bisphenol A having a melt volume flow rate MVR of 6 cm$^3$/(10 min) (as per ISO 1133:2012-03, at a test temperature of 300° C. and 1.2 kg load).
A-3: Polycarbonate from Covestro Deutschland AG. Linear polycarbonate based on bisphenol A having a melt volume flow rate MVR of 19 cm$^3$/(10 min) (as per ISO 1133:2012-03, at a test temperature of 300° C. and 1.2 kg load).
A-4: Makrolon® 2408 powder from Covestro Deutschland AG. Linear polycarbonate based on bisphenol A having a melt volume flow rate MVR of 19 cm$^3$/(10 min) (as per ISO 1133:2012-03, at a test temperature of 300° C. and 1.2 kg load).
A-5: Linear polycarbonate based on bisphenol A and 24% by weight of 4,4-dihyroxydiphenyl having a melt volume flow rate MVR of 8 cm$^3$/(10 min) (as per ISO 1133:2012-03, at a test temperature of 300° C. and 1.2 kg load).
A-6: Polycarbonate from Covestro Deutschland AG. Linear polycarbonate based on bisphenol A having a melt volume flow rate MVR of 16 cm$^3$/(10 min) (as per ISO 1133:2012-03, at a test temperature of 250° C. and 2.16 kg load).
B: Rabitle FP-110 phenoxyphosphazene from Fushimi Pharmaceutical, Japan.
C: Bisphenol A bis(diphenylphosphate) from Remy GmbH & Co. KG, Germany.
D: potassium perfluorobutanesulfonate from Lanxess AG, Leverkusen.
Fibres: Pyrofil TRH50 60M carbon fibres from Mitsubishi Rayon Co., Ltd. having an individual filament diameter of 7 μm, a density of 1.81 g/cm$^3$ and a tensile modulus of 250 GPa. 60 000 individual filaments are supplied in a roving as an endless spool.

Preparation of the Compositions

The polycarbonate compositions described in the examples which follow were produced by compounding in an Evolum EV32HT extruder from Clextral (France) with a screw diameter of 32 mm. The screw set used was L7-8.2 at a throughput of 40-70 kg/h. The speed was 200-300 rpm at a melt temperature of 240-320° C. (according to the composition).

The pellets of the test formulations detailed were dried in a Labotek DDM180 dry air dryer at 80° C. for 4 hours.

Production of the Layers of the Fibre Composite Material/the Multilayer Composite Material:

Production of a Fibre Composite Material Layer

The fibre composite material layers were produced in an experimental setup as described in DE 10 2011 005 462 B3.

The rovings of the above-described fibres were rolled out with constant spool tension from a creel and spread out by means of a spreading apparatus to give a raw fibre tape of individual filaments of width 60 mm in a torsion-free manner.

The raw fibre tape was heated to a temperature above the glass transition temperature of the respective pellets.

The pellets of the respective experimental formulations were melted in an Ecoline 30×25d extruder from Maschinenbau Heilsbronn GmbH and conducted through melt channels to slot dies arranged above and below and transverse to the running direction of the fibre tape. The temperature in the melt zones of the extruder was about 280° C. to 300° C. After emerging from the slot dies, the respective melt encountered the heated raw fibre tape, with contact of the raw fibre tape with the melt on both sides. The raw fibre tape that had been contacted with melt, having been heated further by means of a permanently heated plate, was transported to vibration shoes that were again heated. By means of pressure-shear vibration by means of the vibration shoe as described in DE 10 2011 005 462 B3, the respective melts were introduced into the raw fibre tape. The result was fibre composite material layers of width 60 mm which, after passing through chill rolls, were rolled up.

Assembly of the Fibre Composite Material Layers—Part 1

The composite material layers of width 60 mm were welded at their edges by means of an experimental setup, as described in DE 10 2011 090 143 A1, to give broader tapes of width 480 mm, with all individual filaments still arranged in the same direction. The consolidated composite material layers were rolled up again.

Some of the assembled tapes from part 1 were subdivided into square sections orthogonally to the fibre orientation with a guillotine.

Assembly of the Fibre Composite Material Layers—Part 2

These square sections were consolidated at their original outer edges with a sealing bar to give a continuous composite material layer, and this process resulted in a fibre-reinforced composite material layer in which the orientation for all filaments was the same and was rotated by 90° in relation to the roll-off direction of the composite material layer. The composite material layer that had been consolidated in this way was rolled up.

Production of the Organosheets

All the organosheets examined hereinafter consisted of 4 fibre composite material layers, with 2 outer fibre composite material layers having the same fibre orientation and 2 inner fibre composite material layers having the same fibre orientation, the fibre orientation of the inner fibre composite material layers having been rotated by 90° in relation to the fibre orientation of the outer fibre composite material layers.

For this purpose, fibre composite material layers having corresponding orientation were rolled out and laid one on top of another in the sequence described above. Thereafter, the stack was supplied to a PLA 500 interval heating press from BTS Verfahrenstechnik GmbH and pressed at a temperature above the glass transition temperature of the impregnation formulations to give an organosheet.

The pressure applied across the surface here was 10 bar. The temperature in the heating zone was 280° C. and the temperature in the cooling zone was 100° C. In addition, the advance rate per cycle was 30 mm and the cycle time was 10 sec.

This resulted in samples having total thicknesses of 0.7 mm. The fibre composite material layers used for production of the organosheets accordingly had thicknesses of 175 µm. The fibre volume content of the composite material layers was about 50% by volume per fibre composite material layer.

The organosheets thus produced were used to prepare samples with a Mutronic Diadisc 5200 tabletop circular saw. This involved preparing samples parallel to the fibre orientation in the outer layers, referred to hereinafter as 0° orientation, and transverse to the fibre orientation in the outer layers, referred to hereinafter as 90° orientation.

Methods:

Melt volume flow rate (MVR) was determined according to ISO 1133:2012-03 (at a test temperature of 270° C. or 300° C., mass 1.2 kg) using a Zwick 4106 instrument from Zwick Roell. The abbreviation MRV here means the initial melt volume flow rate (after preheating for 7 minutes); the abbreviation IMVR20' means the melt volume flow rate after 20 minutes.

Melt viscosity was determined in accordance with ISO 11443:2005 with a Göttfert Visco-Robo 45.00 instrument.

The thickness of the multilayer composite materials that result after joining was determined using a commercially available micrometer. The result reported is the arithmetic mean of 5 individual measurements at different positions.

The fire characteristics were measured according to UL94 V on bars of dimensions 127 mm×12.7 mm×organosheet thickness [mm]. For this purpose, multilayer composite materials composed of four layers of fibre composite material were analysed. The fibre material was unidirectionally oriented carbon fibres as described above.

Compositions and Results:

TABLE 1

| Formulation | | Examples | | | | | | |
| --- | --- | --- | --- | --- | --- | --- | --- | --- |
| | | E1 | E2 | E3 | E4 | E5 | E6 | E7 |
| A-1 | % by wt. | 63.00 | 63.00 | | | | | |
| A-2 | % by wt. | 20.00 | 20.00 | | | | | |
| A-3 | % by wt. | | | 63.00 | | 65.00 | 65.00 | |
| A-4 | % by wt. | | | 20.00 | 20.00 | 20.00 | 20.00 | 20.00 |
| A-5 | % by wt. | | | | | | | |
| A-6 | % by wt. | | | | 63.00 | | | 65.00 |
| B | % by wt. | 10.00 | 10.00 | 10.00 | 10.00 | 8.00 | 10.00 | 8.00 |
| C | % by wt. | 7.00 | 7.00 | 7.00 | 7.00 | 7.00 | 5.00 | 7.00 |
| D | % by wt. | | | | | | | |
| Tests | | | | | | | | |
| MVR (300° C., 1.2 kg) | cm³/(10 min) | 26.5 | 31.9 | 66.6 | n.m. | 63.6 | 63.3 | n.m. |
| IMVR20' (300° C., 1.2 kg) | | 26.5 | 33.0 | 74.5 | n.m. | 63.5 | 61.8 | n.m. |
| ΔMVR/IMVR20' (300° C., 1.2 kg) | | 0.0 | 1.1 | 7.9 | n.m. | -0.1 | -1.5 | n.m. |
| MVR (270° C., 1.2 kg) | cm³/(10 min) | 10.7 | 14.1 | 32.7 | 80.1 | 28.5 | 28.8 | 63.4 |
| IMVR20' (270° C., 1.2 kg) | | 11.1 | 16.5 | 35.5 | 81.3 | 28.4 | 28.7 | 62.4 |
| ΔMVR/IMVR20' (270° C., 1.2 kg) | | 0.4 | 2.4 | 2.8 | 1.2 | -0.1 | -0.1 | -1.0 |
| Melt viscosity at 260° C. | | | | | | | | |
| eta 50 | Pa · s | 365 | 406 | 185 | 94 | 407 | 323 | 211 |
| eta 100 | Pa · s | 363 | 393 | 183 | 91 | 327 | 274 | 161 |
| eta 200 | Pa · s | 361 | 368 | 179 | 88 | 284 | 253 | 133 |
| eta 500 | Pa · s | 319 | 314 | 170 | 82 | 233 | 223 | 115 |
| eta 1000 | Pa · s | 258 | 251 | 150 | 76 | 194 | 189 | 102 |
| eta 1500 | Pa · s | 218 | 211 | 134 | 70 | 169 | 164 | 94 |
| eta 5000 | Pa · s | 105 | 103 | 77 | 48 | 91 | 88 | |
| UL94V(organosheet, 0.7 mm, 0°) | | | | | | | | |
| (48 h, 23° C.) | | V0 | V0 | V0 | V0 | | V0 | V0 |
| (7 d, 70° C.) | | V0 | V0 | V0 | V0 | | V0 | V0 |
| Overall assessment | | V0 | V0 | V0 | V0 | | V0 | V0 |
| UL94V on (organosheet, 0.7 mm, 90°) | | | | | | | | |
| (48 h, 23° C.) | | V0 | V0 | V0 | V0 | | V0 | V0 |
| (7 d, 70° C.) | | V0 | V0 | V0 | V0 | | V0 | V0 |
| Overall assessment | | V0 | V0 | V0 | V0 | | V0 | V0 |

TABLE 1-continued

| Formulation | | E8 | E9 | CE1 | CE2 | CE3 | CE4 |
|---|---|---|---|---|---|---|---|
| A-1 | % by wt. | | | | | | |
| A-2 | % by wt. | | | | | | |
| A-3 | % by wt. | | | 74.87 | 76.87 | | |
| A-4 | % by wt. | 20.00 | 20.00 | 20.00 | 20.00 | 20.00 | 20.00 |
| A-5 | % by wt. | 63.00 | 65.00 | | | 69.80 | 67.00 |
| A-6 | % by wt. | | | | | | |
| B | % by wt. | 10.00 | 8.00 | | 3.00 | 5.00 | 6.00 |
| C | % by wt. | 7.00 | 7.00 | 5.00 | | 5.00 | 7.00 |
| D | % by wt. | | | 0.13 | 0.13 | 0.20 | |
| Tests | | | | | | | |
| MVR (300° C., 1.2 kg) | cm³/(10 min) | 43.9 | 37.7 | 26.6 | 22.1 | 23.0 | 32.6 |
| IMVR20' (300° C., 1.2 kg) | | 43.8 | 36.8 | 27.5 | 22.2 | 22.7 | 31.9 |
| ΔMVR/IMVR20' (300° C., 1.2 kg) | | −0.1 | −0.9 | 0.9 | 0.1 | −0.3 | −0.7 |
| MVR (270° C., 1.2 kg) | cm³/(10 min) | 19.8 | 16.5 | 10.4 | 8.1 | 9.0 | 13.9 |
| IMVR20' (270° C., 1.2 kg) | | 19.9 | 16.6 | 10.5 | 8.3 | 9.0 | 14.1 |
| ΔMVR/IMVR20' (270° C., 1.2 kg) | | 0.1 | 0.1 | 0.1 | 0.2 | 0.0 | 0.2 |
| Melt viscosity at 260° C. | | | | | | | |
| eta 50 | Pa · s | 519 | 505 | 575 | 655 | 813 | 519 |
| eta 100 | Pa · s | 428 | 439 | 547 | 646 | 803 | 470 |
| eta 200 | Pa · s | 358 | 393 | 523 | 628 | 732 | 439 |
| eta 500 | Pa · s | 295 | 320 | 452 | 542 | 571 | 371 |
| eta 1000 | Pa · s | 235 | 258 | 361 | 421 | 411 | 291 |
| eta 1500 | Pa · s | 198 | 217 | 299 | 344 | 321 | 244 |
| eta 5000 | Pa · s | 98 | 105 | 139 | 158 | 151 | 114 |
| UL94V(organosheet, 0.7 mm, 0°) | | | | | | | |
| (48 h, 23° C.) | | V0 | V0 | * | V1 | V0 | V0 |
| (7 d, 70° C.) | | V0 | V0 | * | V1 | V1 | V1 |
| Overall assessment | | V0 | V0 | * | V1 | V1 | V1 |
| UL94V on (organosheet, 0.7 mm, 90°) | | | | | | | |
| (48 h, 23° C.) | | V0 | V0 | * | failed | V1 | V1 |
| (7 d, 70° C.) | | V0 | V0 | * | failed | V0 | V0 |
| Overall assessment | | V0 | V0 | * | failed | V1 | V1 |

* no processing as matrix material possible
n.m.: not measurable
failed: no UL94 class The results show that it is possible only with the compositions used in accordance with the invention to attain a V0 classification coupled with good processability and usability of the composition as a matrix material; the compositions according to the comparative examples did not give organosheets that attained a V0 classification or were not a suitable matrix material for the production of organosheets for lack of processability.

The invention claimed is:
1. A fibre composite material comprising at least one layer of fibre material embedded into a composition wherein the composition comprises
A) at least 65% by weight of at least one aromatic polycarbonate,
B) 7% by weight to 15% by weight of at least one cyclic phosphazene of formula (1)

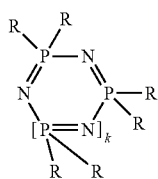

(1)

where
R is the same or different and is an amine radical, and in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$- aryloxy radical, in each case optionally alkyl- and/or halogen-substituted $C_7$- to $C_{12}$-aralkyl radical or a halogen radical or an OH radical,
k is an integer from 1 to 10,
C) 0% to 11% by weight of at least one phosphorus compound of the general formula (2)

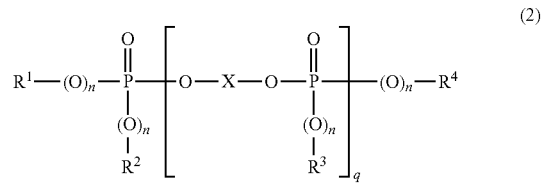

(2)

where
$R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or C$_7$- to C$_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged, and wherein the composition is free of anti-dripping agents and free of talc, and wherein a total of at least 14% by weight of component B+component C is present, based on the overall composition.

2. The fibre composite material according to claim 1, wherein the fibre material is selected from the group consisting of carbon fibres, glass fibres, basalt fibres and mixtures thereof.

3. The fibre composite material according to claim 1, wherein the fibre material is an endless fibre material, a woven fibre material or a knitted fibre material.

4. The fibre composite material according to claim 1, wherein the fibre material are endless fibres and the endless fibres are aligned unidirectionally.

5. The fibre composite material according to claim 1, wherein the composition comprises
 A) at least 75% by weight of at least one aromatic polycarbonate,
 B) 7% by weight to 12% by weight of at least one cyclic phosphazene of formula (1),
 C) 4% by weight to 10% by weight of at least one phosphorus compound of the general formula (2).

6. The fibre composite material according to claim 1, wherein the composition does not contain any inorganic fillers.

7. The fibre composite material according to claim 1, wherein the composition consists of
 A) 75% by weight to 87% by weight of at least one aromatic polycarbonate,
 B) 8% by weight to 10% by weight of at least one cyclic phosphazene of formula (1), wherein the cyclic phosphazene of component B present is at least phenoxyphosphazene,
 C) 5% to 7% by weight of at least one phosphorus compound of the general formula (2) wherein the only phosphorus compound of the formula (2) present is the phosphorus compound of the formula (2b)

and the fibre material comprises unidirectionally oriented endless carbon fibres.

8. The fibre composite material according to claim 7, wherein the sole cyclic phosphazene of the formula (1) present is phenoxyphosphazene and the proportion of cyclic phosphazene with k=1 is 50 to 98 mol %, based on the total amount of cyclic phosphazene of the formula (1).

9. A multilayer composite material comprising at least two mutually superposed layers of the fibre composite material according to claim 1.

10. The multilayer composite material according to claim 9, comprising at least three mutually superposed layers the fibre composite material which are defined relative to one another as two outer layers of fibre composite material and at least one inner layer of fibre composite material, wherein the inner layers of fibre composite material have essentially the same orientation and the orientation thereof relative to the outer layers of fibre composite material is rotated by 30° to 90°, wherein the orientation of one layer of fibre composite material is determined by the orientation of the unidirectionally aligned fibres present therein.

11. The process for producing a multilayer composite material according to claim 9, comprising the following steps:

providing at least one inner layer of fibre composite material and two outer layers of fibre composite material, wherein the individual layers of fibre composite material are produced by applying a molten composition comprising
 A) at least 65% by weight of at least one aromatic polycarbonate,
 B) 7% by weight to 15% by weight of at least one cyclic phosphazene of formula (1)

(1)

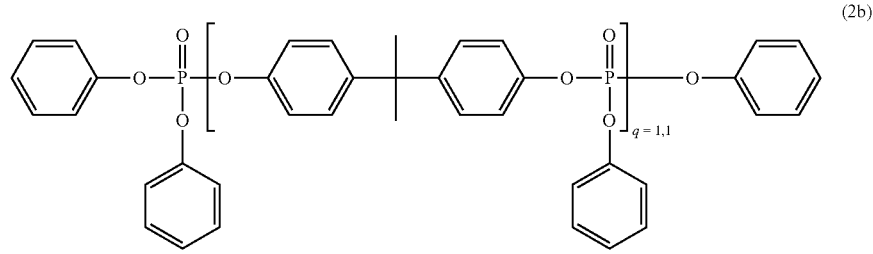

(2b)

with an average q value q=1.0 to 1.2,

D) 0% to 10% by weight of one or more further additives other than components B and C, selected from the group consisting of UV stabilizers, IR absorbers, antioxidants, demoulding agents, flow auxiliaries, antistats, impact modifiers, colourants, thermal stabilizers, further flame retardants, where R is the same or different and is an amine radical, an in each case optionally halogenated C$_1$- to C$_8$-alkyl radical, C$_1$- to C$_8$-alkoxy radical, in each case optionally alkyl- and/or halogen-substituted C$_5$- to C$_6$-cycloalkyl radical, in each case optionally alkyl- and/or halogen- and/or hydroxyl-substituted C$_6$- to C$_{20}$-aryloxy radical, in each case optionally alkyland/or halogen-substituted $C_7$- to $C_{12}$-aralkyl radical or a halogen radical or an OH radical, k is an integer from 1 to 10, C) 0% to 11% by weight of at least one phosphorus compound of the general formula (2)

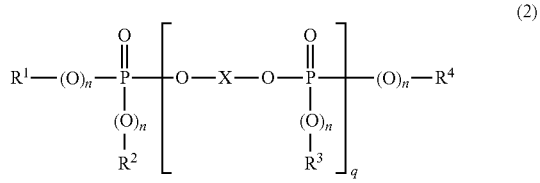

where $R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged, to a raw fibre tape composed of fibre material that has been preheated to above the glass transition temperature of the polycarbonate, wherein the composition is applied to the raw fibre tape under pressure-shear vibration, layering the layers of fibre composite material in the desired orientation relative to one another, based on the orientation of the fibre material, bonding the layered layers of fibre composite material to form the multilayer composite material.

12. A process for producing a layer of fibre composite material according to claim 1, wherein a molten composition comprising A) at least 65% by weight of at least one aromatic polycarbonate, B) 7% by weight to 15% by weight of at least one cyclic phosphazene of formula (1)

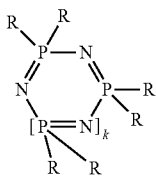

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$- aryloxy radical, in each case optionally alkyl- and/or halogen-substituted $C_7$- to $C_{12}$-aralkyl radical or a halogen radical or an OH radical, k is an integer from 1 to 10, C) 0% to 11% by weight of at least one phosphorus compound of the general formula (2)

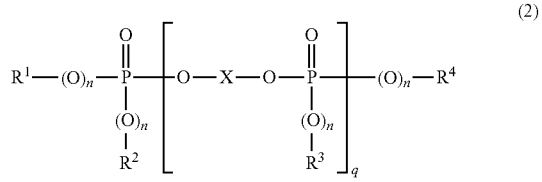

where $R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged, is applied under pressure-shear vibration to a raw fibre tape composed of fibre material that has been preheated to above the glass transition temperature of the polycarbonate.

13. A housing component comprising the fibre composite material according to claim 1.

* * * * *